United States Patent
Oiwa

[11] Patent Number: 5,953,655
[45] Date of Patent: Sep. 14, 1999

[54] VOICE STORAGE SYSTEM

[75] Inventor: Yoko Oiwa, Kawasaki, Japan

[73] Assignee: Fujitsu Limited, Kanagawa, Japan

[21] Appl. No.: 08/570,981

[22] Filed: Dec. 12, 1995

[30] Foreign Application Priority Data

May 11, 1995 [JP] Japan ...................................... 7-113357

[51] Int. Cl.⁶ .............................. H04Q 7/20; H04Q 7/24; H04Q 7/38
[52] U.S. Cl. .......................... 455/412; 455/413; 455/433; 455/432; 455/403
[58] Field of Search ..................................... 455/412, 413, 455/433, 435; 379/67, 88, 89, 432, 403, 414

[56] References Cited

U.S. PATENT DOCUMENTS

| 5,003,576 | 3/1991 | Helferich | 455/422 |
| 5,177,780 | 1/1993 | Kasper et al. | 455/422 |
| 5,497,412 | 3/1996 | Lannen et al. | 455/422 |
| 5,506,888 | 4/1996 | Hayes et al. | 455/422 |
| 5,627,877 | 5/1997 | Penttonen | 455/422 |

FOREIGN PATENT DOCUMENTS 64-46332  2/1989  Japan .
WO94/23506 10/1994  Sweden .

Primary Examiner—Wellington Chin
Assistant Examiner—Keith Ferguson
Attorney, Agent, or Firm—Helfgott & Karas, PC.

[57] ABSTRACT

A voice storage system includes a plurality of voice storage modules in which a voice message for a subscriber is recorded and stored. A mobile transit switch selects one of the plurality of voice storage modules when a recording request call is received, so that the voice message is recorded in the selected voice storage module. A home location memory stores a normalized number including a voice storage module number of the selected voice storage module and a management number including a subscriber identification number of the subscriber which are correlated with respect to the recorded voice message. A voice message reproducing unit issues a reproducing request to one of the voice storage modules when a reproducing request call is received, the voice message reproducing unit receiving the normalized number from the home location memory, and the above one of the voice storage modules being identified by the voice storage module number included in the normalized number, so that the above one of the voice storage modules reproduces the voice message.

12 Claims, 27 Drawing Sheets

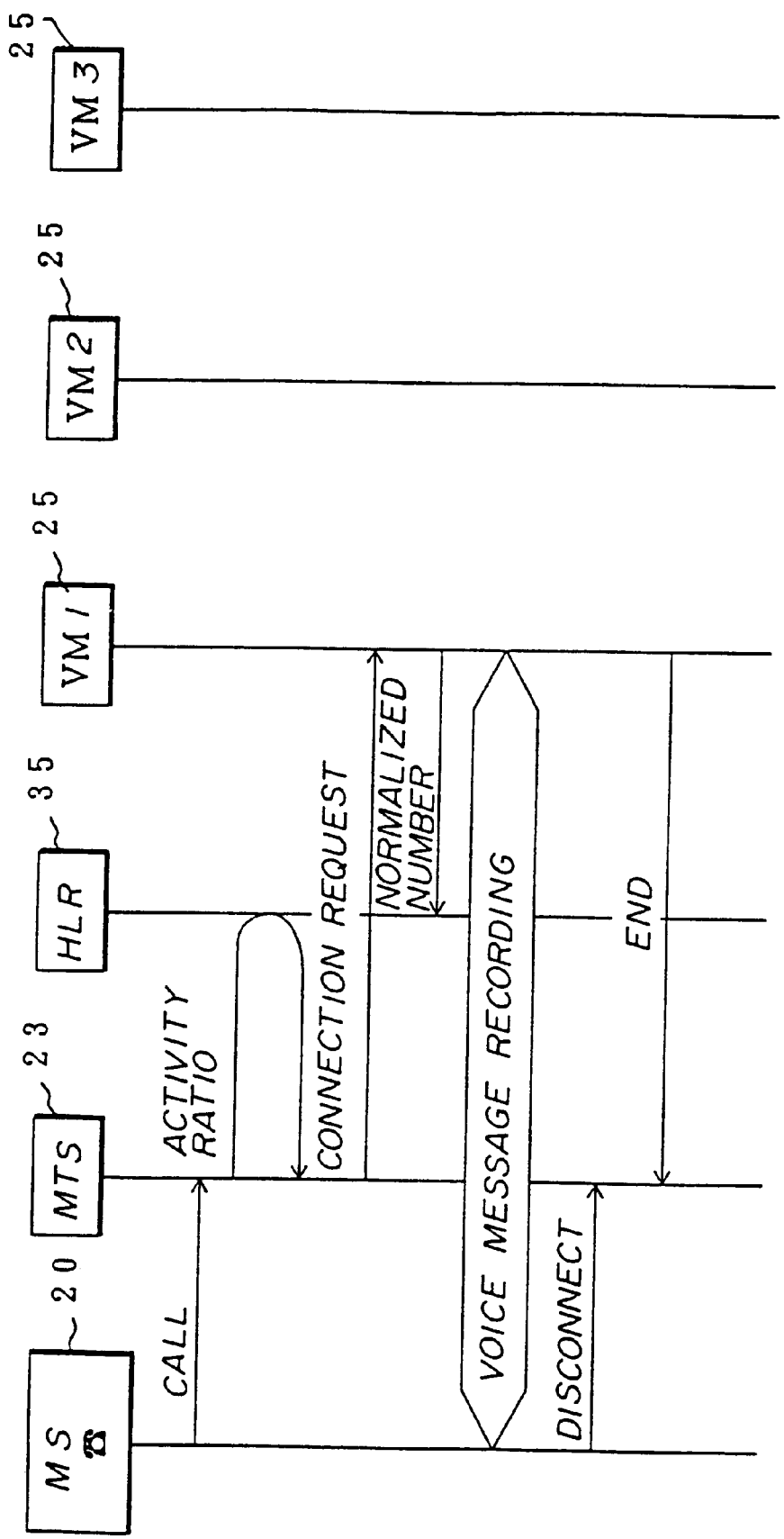

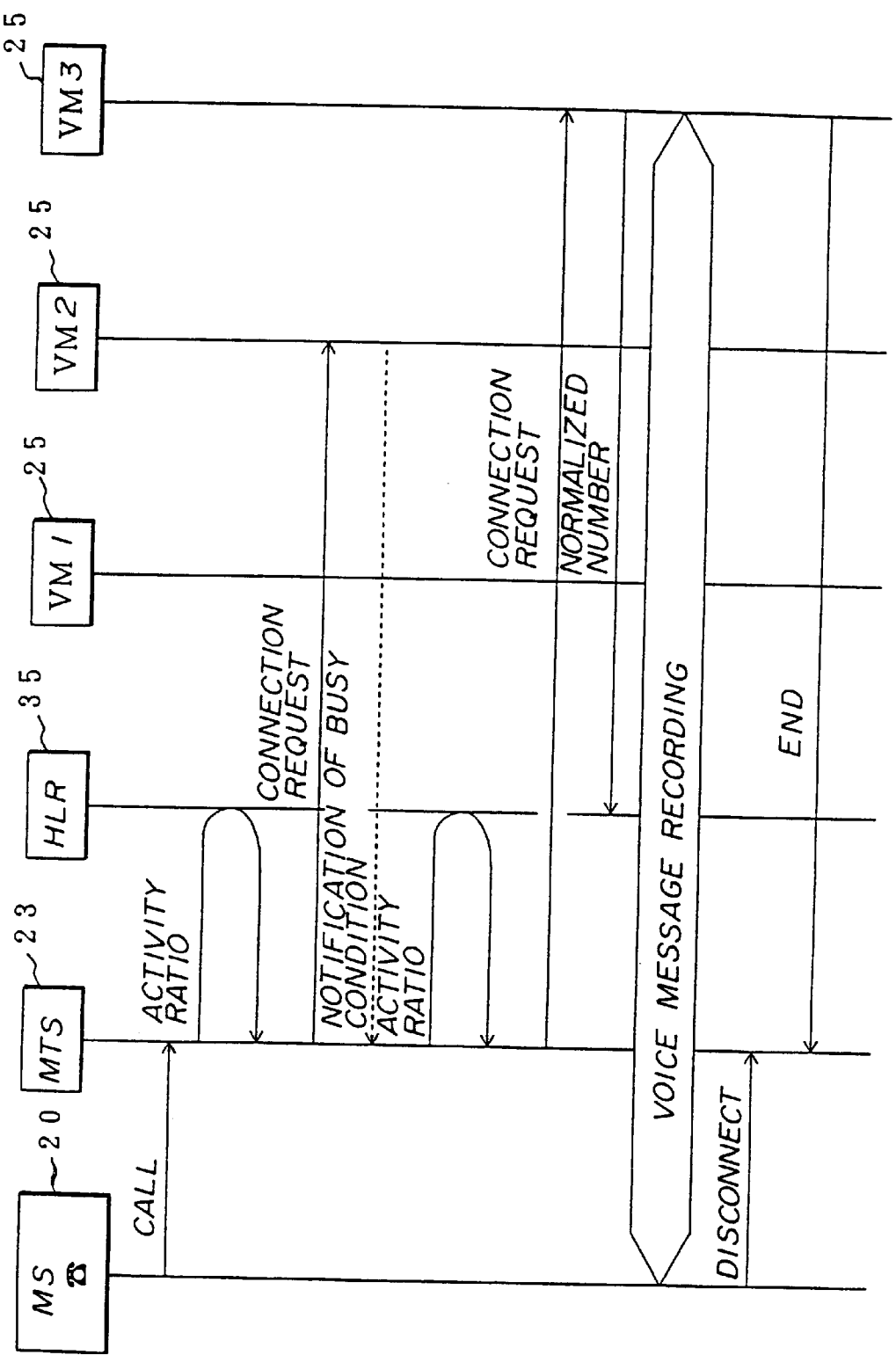

VOICE STORAGE SYSTEM

BACKGROUND OF THE INVENTION

(1) Field of the Invention

The present invention generally relates to a voice storage system and, more particularly, to a voice storage system which provides voice message recording and reproducing functions for subscribers in a mobile communications network.

(2) Description of the Related Art

FIG. 1 shows a conventional voice storage system, and FIG. 2 shows a sequence of voice message recording procedures performed by the voice storage system in FIG. 1.

The conventional voice storage system allocates a voice storage module (VM) in which a voice message for a subscriber is recorded, with respect to the subscriber.

Referring to FIGS. 1 and 2, a recording request call from a mobile station (MS) 10 is issued to a base station (BS) 11 the recording request call requesting the voice storage system to record the voice message for the subscriber in a fixed voice storage module (VM) 16 allocated for the subscriber. A signal indicative of the recording connection request from the BS 11 is issued to a mobile local switch (MLS) 12. In response to the signal, the mobile local switch 12 issues an inquiry to a home location register (HLR) 13. By the inquiry, the mobile local switch 12 requests the home location register 13 to send back the location of a master mobile transit switch (M-MTS) 15 connected to the fixed VM 16.

In accordance with the information sent from the home location register (HLR) 13, the mobile local switch 12 is connected to the VM 16 via the master mobile transit switch 15 and a mobile transit switch (MTS) 14 in order to perform a voice message recording function. After the connection of the mobile local switch 12 and the voice storage module 16 is established, a sequence of voice message recording procedures is performed. During the sequence, the voice message from the mobile station 10 is recorded and stored in the voice storage module 16.

In the conventional voice storage system, the voice storage module 16 in which the voice message for the subscriber is recorded is allocated with respect to the subscriber. However, when the voice storage module 16 is in a system-down state, in a congestion state or in a busy condition, the mobile station 10 is not able to have access to the voice storage module 16. Thus, the conventional voice storage system cannot record all the voice messages for the subscriber by the voice message recording function when the voice storage module 16 is in a system-down state, in a congestion state or in a busy condition.

If the quantity of the recorded voice messages reaches the capacity of the storage of the VM 16, it is impossible to record an additional voice message for the same subscriber in the VM 16.

SUMMARY OF THE INVENTION

An object of the present invention is to provide an improved voice storage system in which the above-described problems are eliminated.

Another object of the present invention is to provide a voice storage system which reliably provides the subscribers with voice message recording and reproducing functions even when one of voice storage modules is in a system-down state, in a congestion state or in a busy condition.

Still another object of the present invention is to provide a voice storage system which allows an additional voice message to be recorded in any of a plurality of voice storage modules even when the quantity of voice messages recorded in one of the voice storage modules reaches the capacity of the storage thereof.

The above-mentioned objects of the present invention are achieved by a voice storage system which includes: a plurality of voice storage modules in which a voice message for a subscriber is recorded and stored; a mobile transit switch which selects one of the plurality of voice storage modules when a recording request call is received, so that the voice message is recorded in the selected voice storage module; a home location memory which stores a normalized number including a voice storage module number of the selected voice storage module and a management number including a subscriber identification number of the subscriber which are correlated with respect to the recorded voice message; and a voice message reproducing unit, provided in the mobile transit switch, which issues a reproducing request to one of the voice storage modules when a reproducing request call is received, the voice message reproducing unit receiving the normalized number from the home location memory, the normalized number related to the subscriber identification number included in the reproducing request call, the above one of the voice storage modules being identified by the voice storage module number included in the normalized number, so that the above one of the voice storage modules reproduces the voice message in response to the reproducing request.

The voice storage system of the present invention selects one of the voice storage modules (VM) with respect to each voice message and allocates the selected voice storage module (VM) to record the voice message therein. In addition, the voice storage system of the present invention allows the home location register (HLR) to store the normalized number, including the voice storage module number and the voice message recording time with respect to each voice message. In addition, the voice storage system of the present invention selects one of the voice storage modules (VM) in accordance with the smallest activity ratio, and it is possible to prevent the quantity of the recorded voice messages in each voice storage module from exceeding the capacity of the storage.

BRIEF DESCRIPTION OF THE DRAWINGS

The above and other objects, features and advantages of the present invention will become more apparent from the following detailed description when read in conjunction with the accompanying drawings in which:

FIGS. 10 through 13 are diagrams for explaining various sequences of voice message recording procedures;

DESCRIPTION OF THE PREFERRED EMBODIMENTS

A description will now be given of preferred embodiments of the present invention with reference to the accompanying drawings.

Figure 4:
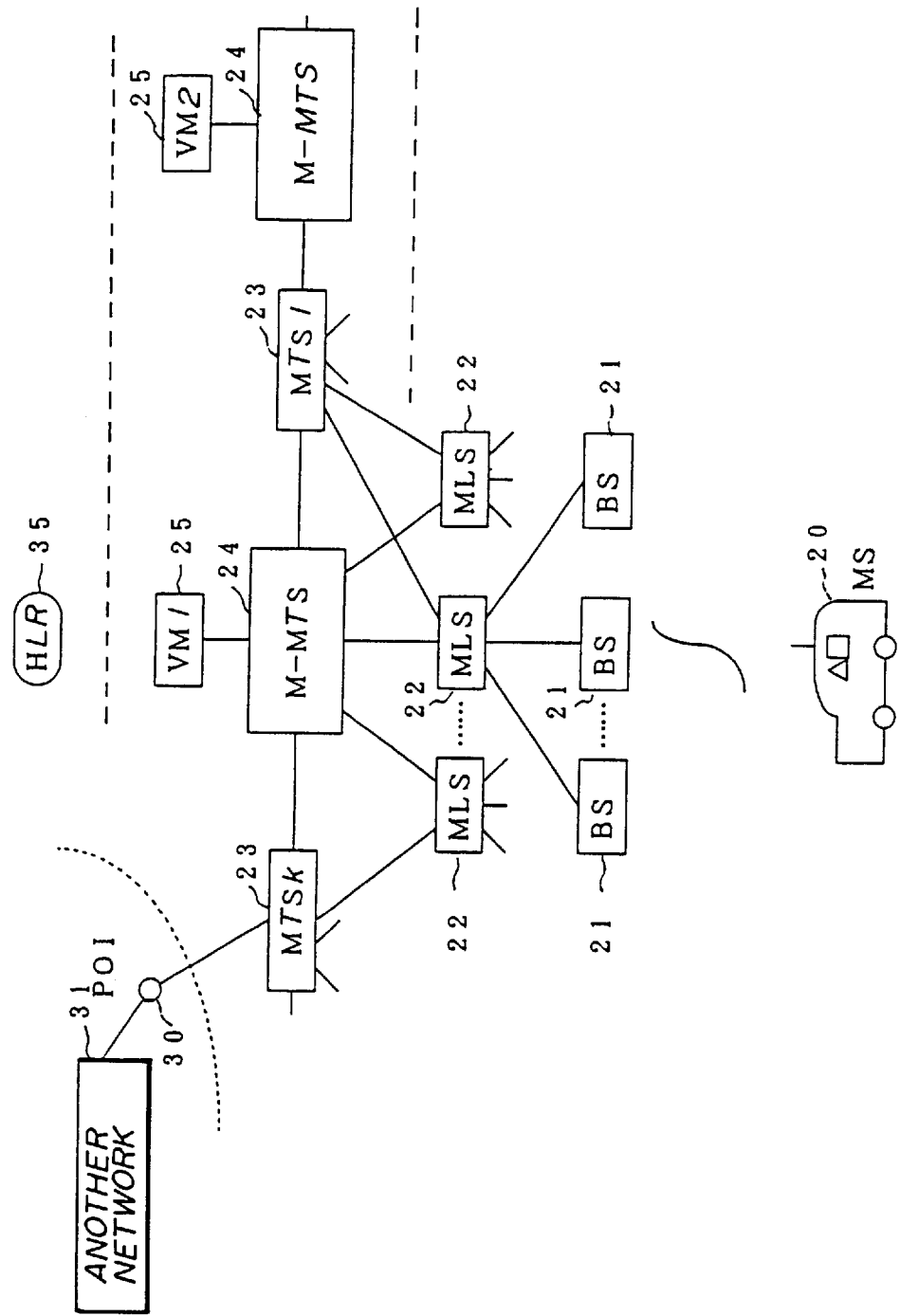
FIG. 4 is a diagram showing a mobile communications network to which the embodiment of the present invention is applied.

FIG. 4 shows a mobile communications network to which the embodiment of the present invention is applied.

Referring to FIG. 4, a mobile station (MS) 20 is connected to the nearest one among a plurality of base stations (BS) 21. The plurality of base stations 21 are connected to one of a plurality of mobile local switches (MLS) 22.

The plurality of mobile local switches 22 are connected to a master mobile transit switch (M-MTS) 24. The master mobile transit switch 24 is connected to a voice storage module (VM1) 25. The above one of the mobile local switches 22 is connected also to a mobile transit switch (MTS1) 23. Similarly, the other mobile local switches 22 are connected to another mobile transit switch (MTSk) 23 or to another master mobile transit switch (M-MTS) 24. This other master mobile transit switch 24 is connected to another voice storage module (VM2) 25.

The mobile transit switches (ITS) 23 have the gateway linking function and the transit linking function. The mobile local switches (MLS) 22 have the visited mobile switching function and the mobile subscriber linking function. The subscriber identification numbers and the visited mobile area locations are recorded in a home location register (HLR) 35.

In the above mobile communications network, the above-mentioned mobile transit switch (MTSk) 23 is connected to another network 31 via a point of interface (POI) 30. A normalized number is recorded in the home location register (HLR) 35, which is used to identify each voice message. Accordingly, one or more normalized numbers may be recorded in the HLR 35 with respect to each of a plurality of subscriber identification numbers.

Figure 5:
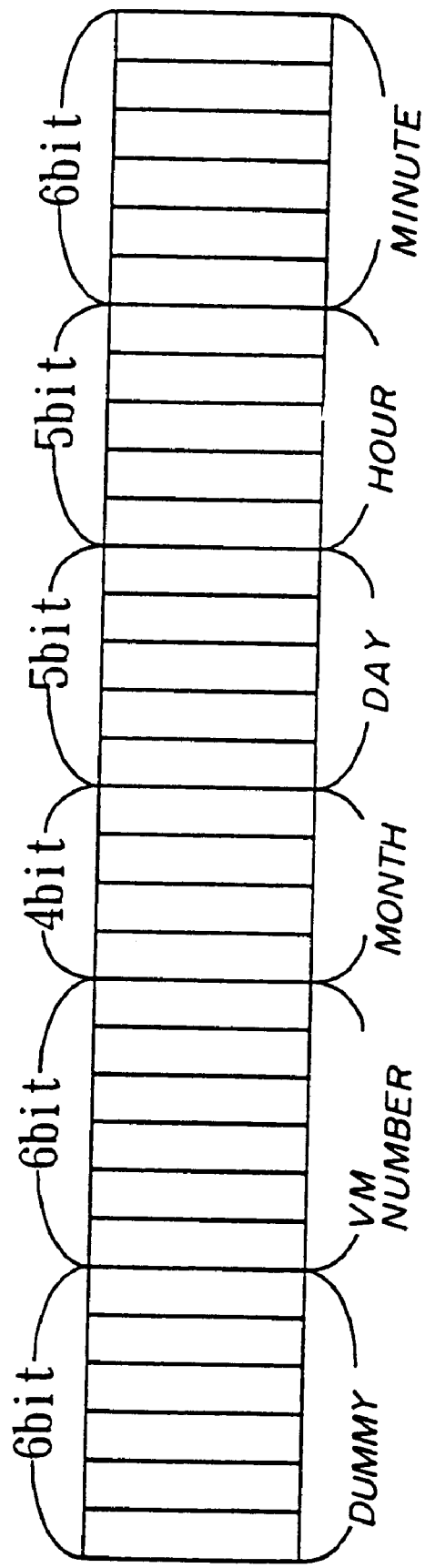
FIG. 5 is a diagram showing a format of a normalized number used by the voice storage system.

FIG. 5 shows a format of the normalized number. Referring to FIG. 5, the normalized number consists of a 6-bit dummy (the most significant digits), a 6-bit voice storage module number (which will be called the VM number), 4 bits for recording the month, 5 bits for recording the day, 5 bits for recording the hour, and 6 bits for recording the minute. The VM number included in the normalized number is used to identify the voice storage module (VM) in which a corresponding voice message is recorded. For example, a normalized number of a voice message which was recorded in a voice storage module with a VM number of 12 on April 25 at 15:30 is represented by "00C4CBDE" in hexadecimal.

In order to identify the location of one of the voice storage modules (VM) a management number in which the VM number included in the normalized number is replaced by the subscriber identification number and the other items included in the normalized number remain unchanged is used. By using the management number, the voice messages recorded in the voice storage module (VM) with respect to each of the mobile subscribers are managed.

The voice storage system of the present invention allocates the voice storage modules to the voice messages, rather than allocating the voice storage modules to the mobile subscribers. In other words, the voice storage system of the present invention allocates one of the voice storage modules (VM) to each normalized number.

Figure 1:
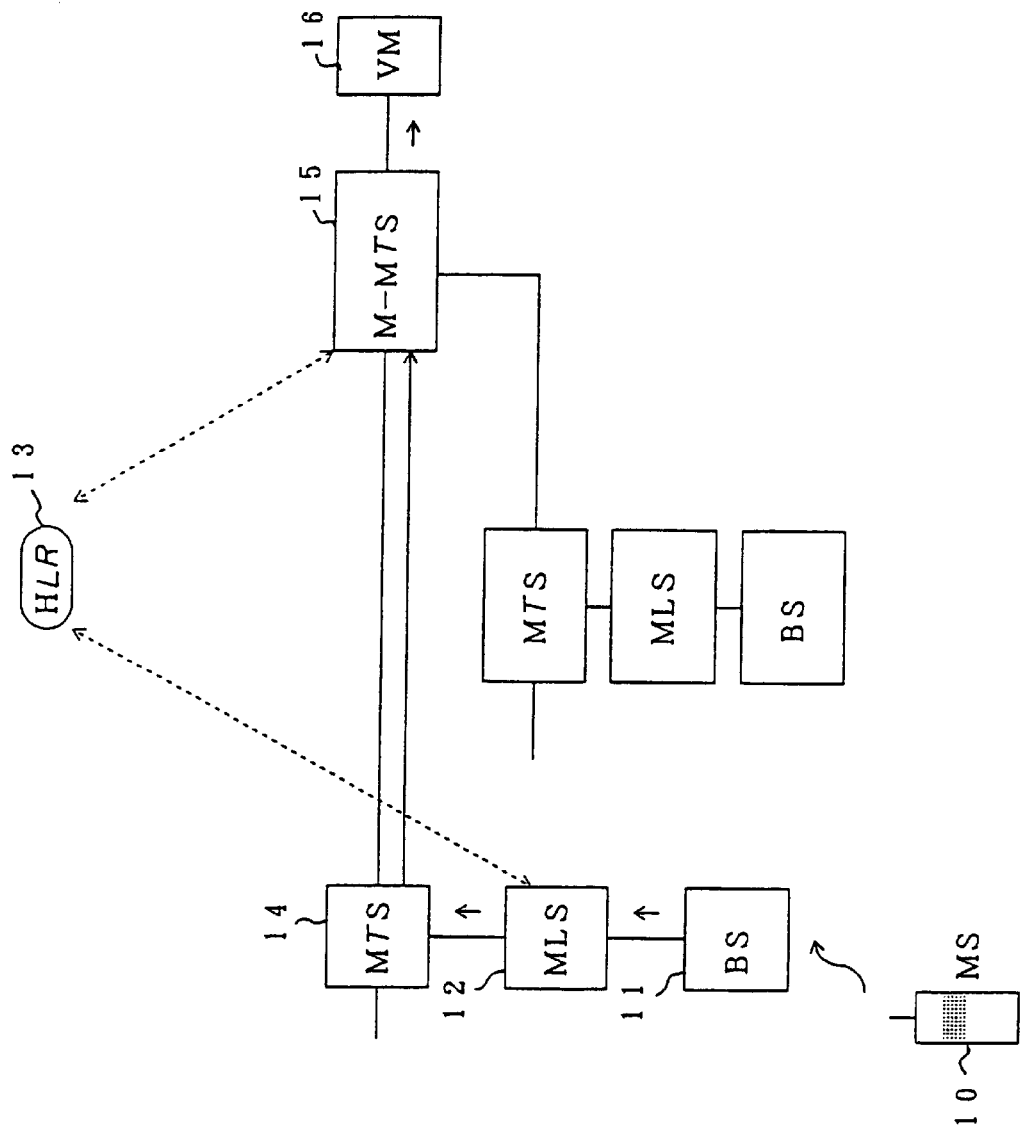
FIG. 1 is a block diagram of a conventional voice storage system.
Figure 2:
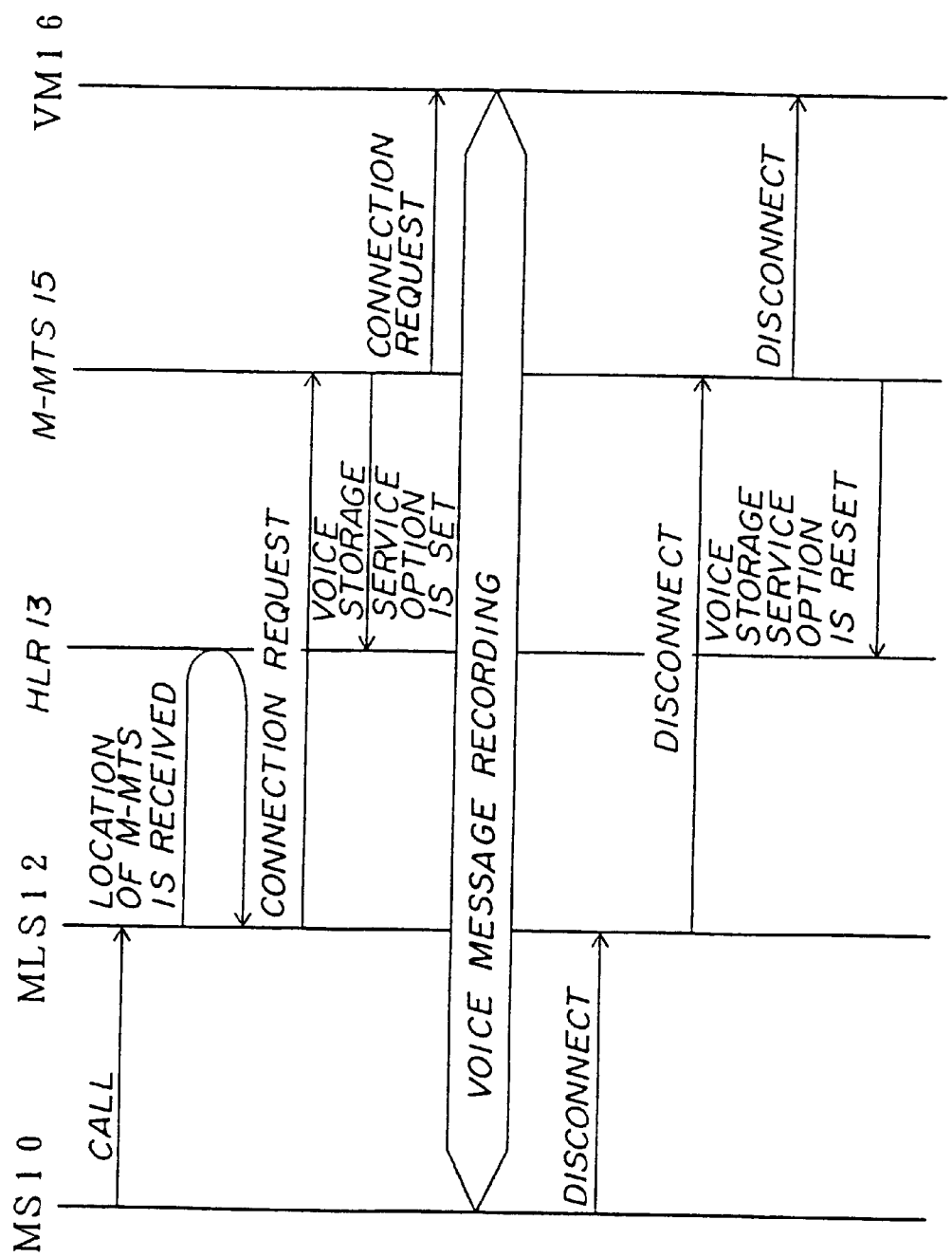
FIG. 2 is a diagram for explaining a sequence of voice message recording procedures performed by the conventional voice storage system.
Figure 3:
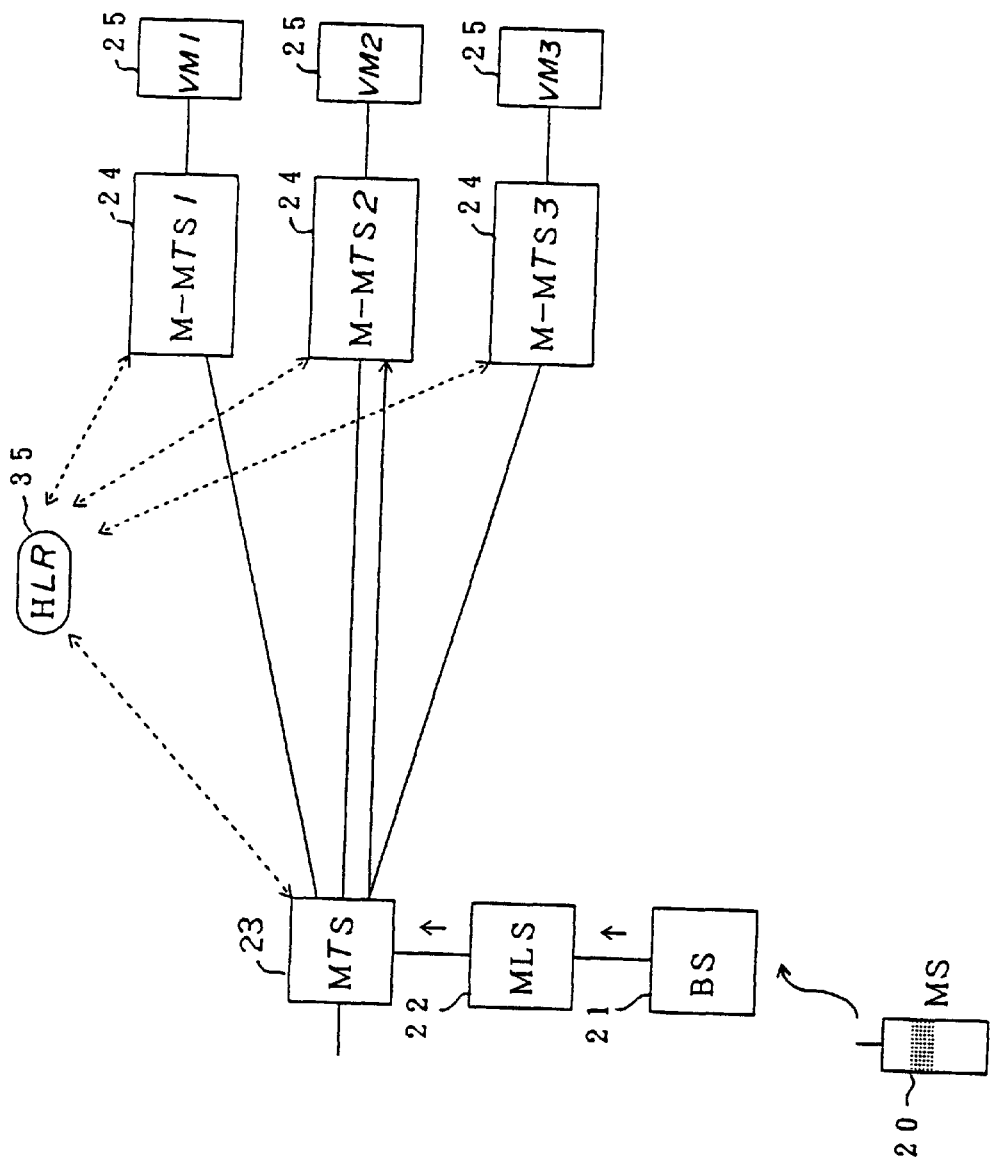
FIG. 3 is a block diagram of a voice storage system in one embodiment of the present invention.

FIG. 3 shows a voice storage system in one embodiment of the present invention. The voice storage system includes at least one base station 21, at least one mobile local switch 22, at least one mobile transit switch 23, the home location register 35, the master mobile transit switches 24, and the voice storage modules 25. The above voice storage system provides the subscriber on the mobile station 20 with a voice storage service on the mobile communications network.

Referring to FIG. 3, the mobile station (MS) 20 transmits a voice message recording request to the base station (BS) 21. The voice message recording request is transported from the base station 21 to the mobile transit switch (MTS) 23 via the mobile local switch (MLS) 22. The mobile transit switch 23 issues an inquiry to the home location register (HLR) 35. By this inquiry, the mobile transit switch 23 requests the home location register 35 to send back the location of one of the voice storage modules (VM) 25 in which the voice message is to be recorded. In the present case, the voice storage module (VM2) is determined to be one of the voice storage modules 25 which is appropriate for recording the voice message therein.

In accordance with the data from the home location register 35, the mobile transit switch 23 selects the above one (VM2) of the voice storage modules 25. The mobile transit switch 23 transmits the voice message recording request to the selected VM2 25 via the master mobile transit switch (M-MTS2) 24. The voice message from the mobile station 20 is recorded in the selected VM2 25.

The master mobile transit switch (M-MTS2) 24 transmits a management number of the recorded voice message to the home location register (HLR) 35. The management number from the master mobile transmit switch 24 is converted by the home location register 35 into a normalized number. The normalized number is recorded in the home location register 35 with respect to each voice message which is recorded.

When a voice message reproducing request from a calling mobile station (MS) 20 is transmitted to the above mobile transit switch (MTS) 23 via the base station (BS) 21 and the mobile local switch (MLS) 22, the mobile transit switch (MTS) 23 issues an inquiry to the home location register (HLR) 35 with a subscriber identification number included in the voice message reproducing request. By this inquiry, the MTS 23 requests the HLR 35 to send back all the normalized numbers related to the subscriber identification number included in the reproducing request.

In accordance with one of the normalized numbers from the HLR 35, the MTS 23 transmits the voice message reproducing request to the voice storage module (VM) 25 via the master mobile transit switch (M-MTS) 24. The location of the above VM 25 is identified by the MTS 23 by the VM number included in each normalized number. The sequence of reproducing the voice messages is determined according to the value of each of the normalized numbers from the HLR 35. The voice message reproduced at each of the voice storage modules 25 is transported to the calling mobile station (MS) 20.

Figure 6:
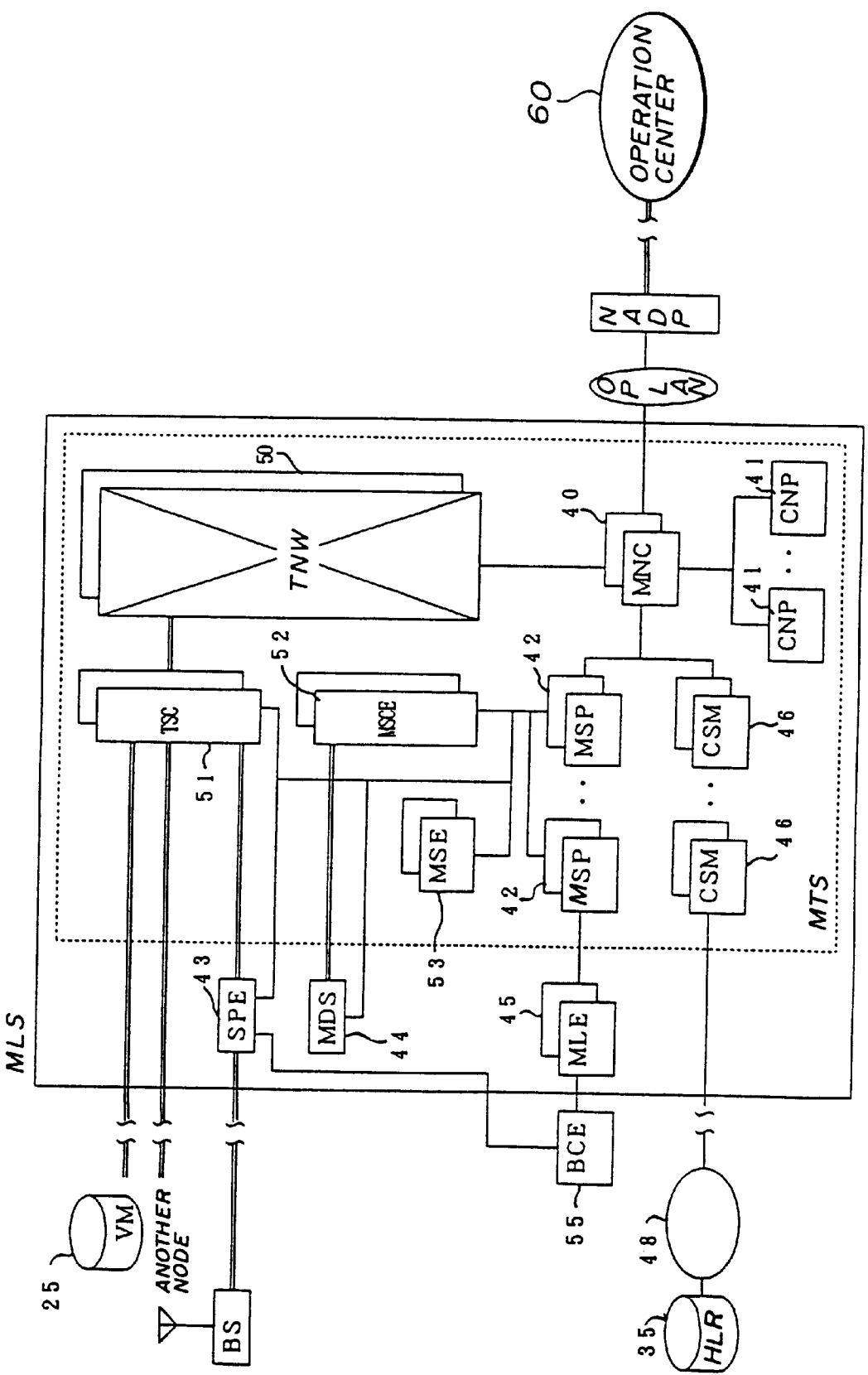
FIG. 6 is a diagram showing a hardware system configuration of a mobile local switch.

FIG. 6 shows a hardware system configuration of the mobile local switch (MLS) 23 in FIG. 3.

Referring to FIG. 6, a multiplexer network control unit (MNC) 40 carries out management and maintenance of the whole mobile local switch system. A plurality of call control processors (CNP) 41 have call control and traffic control processing functions by a traffic-load distribution method. A plurality of mobile communication signal processors (MSP) 42 control trunk signaling and connecting equipment (TSC) 51, speech processing equipment (SPE) 43, mobile data service equipment (MDS) 44, and mobile subscriber link signaling equipment (MLE) 45. The SPE 43, the MDS 44 and the MLE 45 are mobile subscriber connecting units. A plurality of common channel signaling modules (CSM) 46 have a common channel signaling function needed to communicate with another network 48 or another node.

A time division switching network (TNW) 50 is a time division communication highway utilizing a multiplex time switch. The trunk signaling and connecting equipment (TSC) 51 includes a trunk transmission line, and the TSC 51 has station-to-station signal transmitting and receiving functions. Mobile signaling equipment (MSE) 53 has an audible sound-signal supplying function, a communication monitoring function, and a channel switching function. Mobile signaling and connecting equipment (MSCE) 52 provides simplex and duplex signaling of the highway of the TNW 50. The MSCE 52 has functions of time slot switching and system selecting between the highway of the MDS 44 and the highway of the TNW 50.

The SPE 43 carries out conversions of encoded signals used in radio transmission to and from encoded signals used in the fixed network. Further, the SPE 43 is controlled by the MSP 42 to carry out non-telephone data communication control and multiplex control of the communication and control lines.

The MDS 44 is signaling equipment including a facsimile communication trunk and a modem communication trunk. The MDS 44 carries out conversions of communication format and protocol between a station of the radio transmission and a station of the fixed network.

The MLE 45 is connected to base station control equipment (BCE) 55 via the control channels. The MLE 45 has a function to transfer call control data to the radio transmission station, and a function to transfer radio transmission station maintenance data from the BCE 55 to an operation center 60.

The mobile transit switch (MTS) has a hardware system configuration (indicated by a dotted line in FIG. 6) in which the SPE 43, the MDS 44 and the MLE 45 are eliminated from the hardware system configuration of the mobile local switch (MLS).

The master mobile transit switch (M-MTS) has the same hardware system configuration as the mobile transit switch (MTS) mentioned above. In the hardware system configuration of the master mobile transit switch (M-MTS), the voice storage module (VM) 25 is connected to the TSC 51, and the home location register (HLR) 35 is connected to the CSM 46 via the other network 48.

Figure 7:
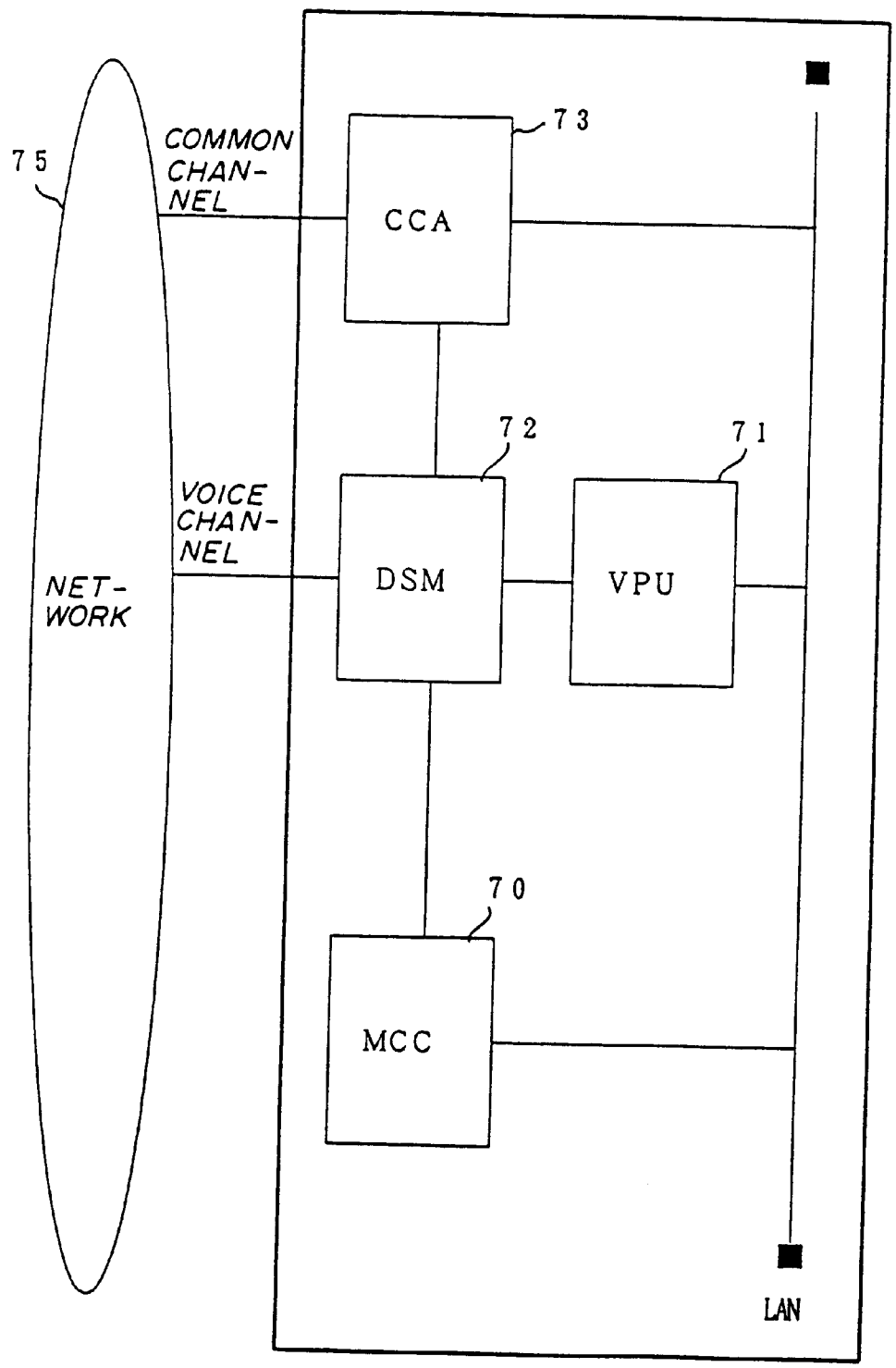
FIG. 7 is a diagram showing a hardware system configuration of a voice storage module.

FIG. 7 shows a hardware system configuration of the voice storage module (VM) 25 in FIG. 3.

Referring to FIG. 7, a master control composite unit (MCC) 70 has a subscriber database management function and a VM component control function. The master control composite unit 70 includes a master control unit (MCU) and a database unit (DBU).

A voice processing unit (VPU) 71 includes a voice storage service application software which is used to control voice processing. The voice processing unit 71 has voice message compression and decompression functions.

A digital switching matrix (DSM) 72 carries out a call distributing processing to distribute a call from a network 75 to the VPU 71.

A call control adapter (CCA) 73 functions as an interface with the common channel of the network 7. The CCA 73 sends information, transported by the network 75, to the MCC 70 via the DSM 72.

Figure 8:
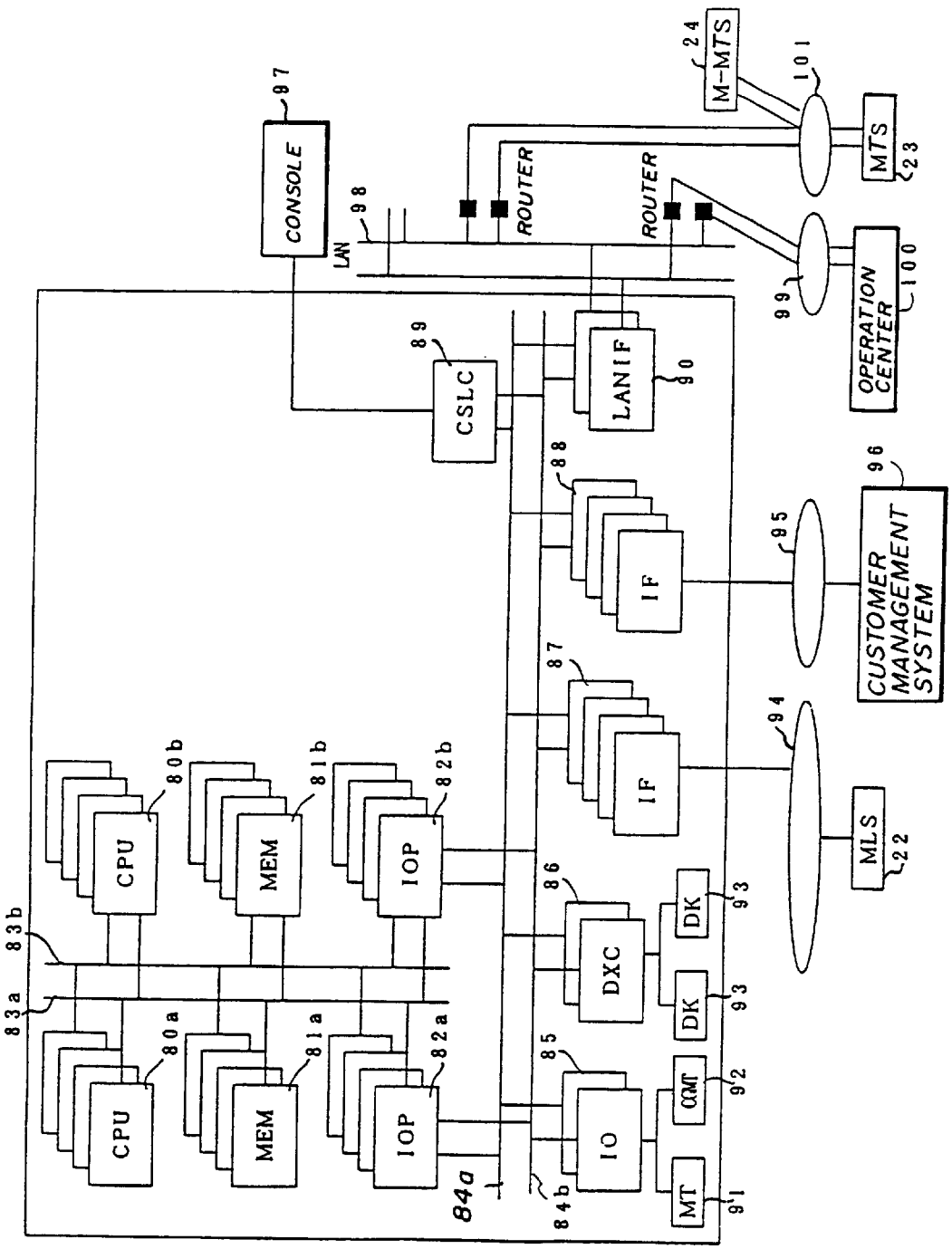
FIG. 8 is a diagram showing a hardware system configuration of a home location register.

FIG. 8 shows a hardware system configuration of the home location register (HLR) 35 in FIG. 3.

Referring to FIG. 8, central processing units (CPU) 80$a$ and 80$b$, random access memories (MEM) 81$a$ and 81$b$, and input-output processors (IOP) 82$a$ and 82$b$ are interconnected by system buses 83$a$ and 83$b$. These elements of the HLR 35 have a duplex configuration. The input-output processors 82$a$ and 82$b$ are connected to each of elements including an external storage interface circuit (IO) 85, a disk controller (DXC) 86, an interface circuit (IF) 87, an interface circuit (IF) 88, a console interface circuit (CSLC) 89, and a local area network interface circuit (LANIF) 90 by input-output buses 84$a$ and 84$b$.

A magnetic tape unit (MT) 91 and a cartridge magnetic tape unit (CGMT) 92 are connected to the external storage interface circuit 85. A plurality of hard disk units 93 are connected to the disk controller 86. Voice storage management information such as the normalized numbers is stored in the hard disk units 93.

The interface circuit 87 is connected to a plurality of mobile local switches (MLS) 22 via a network 94. The interface circuit 88 is connected to a customer management system 96 via a network 95. The customer management system 96 has a subscriber identification number management function. A console 97 is connected to the console interface circuit (CSLC) 89. A local area network (LAN) 98 is connected to the local area network interface circuit 90. The local area network (LAN) 98 is connected to an operation center 100 via a network 99, and connected to the mobile transit switches (MTS) 23 and the master mobile transit switches (M-MTS) 24 via a network 101.

Figure 9B:
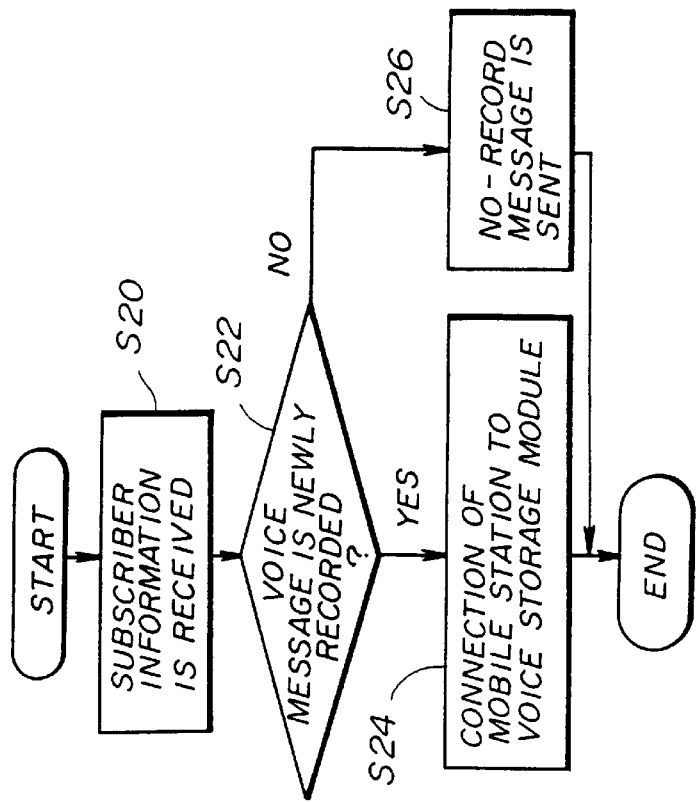
FIGS. 9A and 9B are flowcharts for explaining a voice message recording connection procedure and a voice message reproducing connection procedure.
Figure 9A:
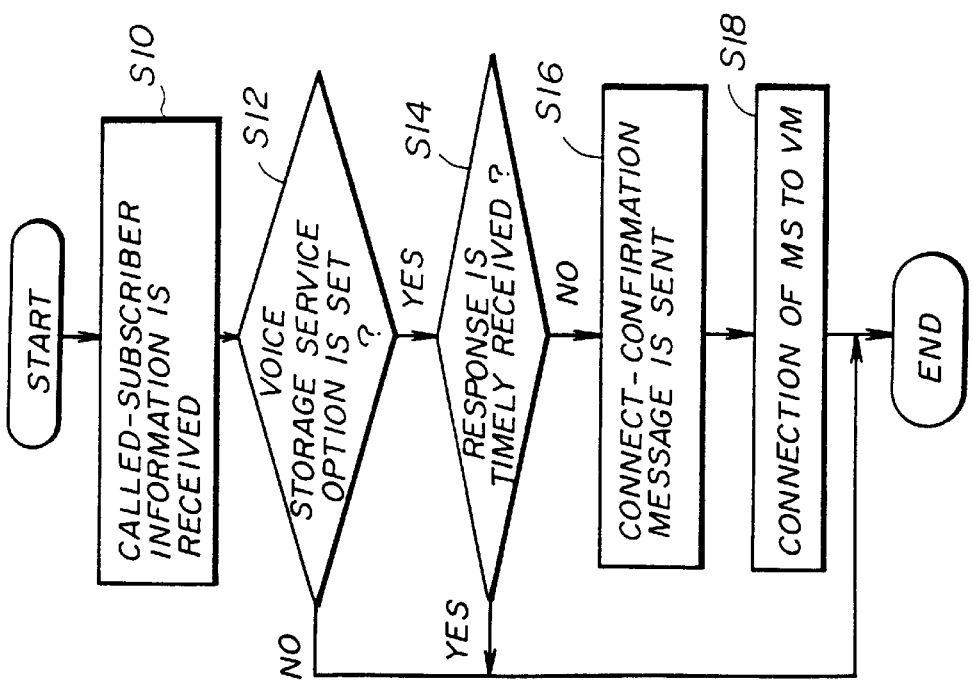

FIG. 9A shows a voice message recording connection procedure performed by the mobile transit switch (MTS), and FIG. 9B shows a voice message reproducing connection procedure performed by the MTS.

Referring to FIG. 9A, the voice message recording procedure is started when a call from the mobile station (MS) to a certain subscriber has been made to the voice storage system. This call is made by the calling subscriber by inputting a control code which designates the voice message recording request.

The mobile transit switch (MTS) 23, at step S10, requests the home location register (HLR) 35 to send back called-subscriber information to the MTS.

The MTS, at step S12, detects whether a voice storage service option is set by the called subscriber in accordance with the called subscriber information from the HLR 35. This voice storage service option is arbitrarily set by a subscriber on a mobile station and the setting of the subscriber is initially recorded in the HLR 35 as part of the subscriber information.

The MTS, at step S14, detects whether a response from the called subscriber is received within a predetermined time.

When the result at the step S12 is affirmative (the voice storage service option is set) and the result at the step S14 is negative (no response from the called subscriber is timely received), the MTS, at step S16, sends back to the calling mobile station (MS) a "connect-confirmation" message indicating that the calling mobile station (MS) is connected to the voice storage module (VM).

After the above step S16 is performed, the MTS, at step S18, performs a connection of the calling mobile station (MS) to the voice storage module (VM) in order to start the voice message recording.

When the result at the above step S12 is negative (the voice storage service option is not set), the voice message recording connection procedure ends and the above steps S14, S16 and S18 are not performed. When the result at the above step S14 is affirmative (the response from the called subscriber is timely received), the voice message recording connection procedure ends and the above steps S16 and S18 are not performed.

Accordingly, when the connection of the mobile station (MS) to the voice storage module (VM) is performed, a voice message from the calling mobile station (MS) is recorded in the voice storage module (VM) in accordance with the option set by the subscriber. When the voice message is recorded, the master mobile transit switch (M-MTS) transports voice message recording information including a management number of the recorded voice message to the home location register (HLR). Thus, the voice message recording information including the management number of the recorded voice message is recorded in the home location register (HLR) 35.

Referring to FIG. 9B, the voice message reproducing connection procedure is started when a call from a subscriber on the mobile station (MS) to the voice storage system has been made. This call is made by the calling subscriber by inputting a control code which designates the voice message reproducing request.

In response to the call from the MS, the MTS, at step S20, requests the home location register (HLR) to transport the subscriber information to the MTS.

The MTS, at step S22, detects whether the subscriber information from the HLR indicates presence of a voice message with respect to the calling subscriber currently recorded.

When the result at the above step S22 is affirmative, the MTS, at step S24, performs a connection of the calling mobile station (MS) to a selected voice storage module (VM), the selected voice storage module (VM) being indicated by the normalized number included in the subscriber information from the HLR. After the connection of the MS to the selected VM is performed the voice message is reproduced at the voice storage module (VM) and it is transported from the voice storage module (VM) to the calling mobile station (MS).

When the result at the above step S22 is negative, the MTS, at step S26, sends back to the calling mobile station (MS) a "no-record" message which indicates that no voice message is currently recorded in the VM.

After the step S24 or the step S26 is performed, the voice message reproducing connection procedure ends.

The reproduction of the voice message by a second mobile station (MS), other than the mobile station (MS) of the subscriber, is allowed only when a password of the subscriber is input from the second mobile station.

FIG. 10 shows a sequence of voice message recording procedures when all the voice storage modules (VM) are in a normal condition. Throughout the sequences all the voice storage modules (VM) are not in a system-down state, in a congestion state, or in a busy condition.

In the sequence shown in FIG. 10, it is assumed that a call from the mobile station (MS) 20 (or any fixed station) to a subscriber was made to the voice storage system and no response from the called subscriber was timely received. After the occurrence of such events, the sequence of voice message recording procedures is started in order to record a voice message from the mobile station (MS) 20 in the voice storage module (VM) 25.

In response to the call from the MS 20, the mobile transit switch (MTS) 23 receives the activity ratio of each of the plurality of voice storage modules (VM) 25 (for example, "VM1", "VM2" and "VM3") from the home location register (HLR) 35. The activity ratio is indicative of an amount of the recorded voice messages relative to the capacity of storage of the voice storage module (VM). The MTS 23 selects one (for example, "VM1") of the voice storage modules 25 in accordance with the smallest activity ratio among the activity ratios of the voice storage modules 25 from the HLR 35.

The MTS 23 issues a connection request to the voice storage module (VM1) 25 with the smallest activity ratio.

In response to the connection request, the voice storage module (VM1) 25 generates a management number of the voice message. The management number of the voice message is converted into a normalized number, and the normalized number of the voice message from the VM1 25 is stored in the home location register (HLR) 35.

After the connection of the MS to the VM1 is performed, the voice message from the mobile station (MS) 20 is recorded in the selected voice storage module (VM1) 25.

After the voice message recording is carried out, the communication line between the mobile station (MS) 20 and the mobile transit switch (MTS) 23 is disconnected. The sequence of the voice message recording procedures shown in FIG. 10 ends.

Accordingly, the voice storage system of the present invention selects one of the voice storage modules (VM) with respect to each voice message, and allocates the selected voice storage module (VM) to record the voice message therein.

In addition, the voice storage system of the present invention allows the home location register (HLR) to store the normalized number with respect to each voice message. The normalized number includes the VM number and the voice message recording time as shown in FIG. 5.

In addition, the voice storage system of the present invention selects one of the voice storage modules (VM) in accordance with the smallest activity ratio, and it is possible to prevent the quantity of the recorded voice messages in each voice storage module from exceeding the capacity of the storage thereof.

FIG. 11 shows a sequence of voice message recording procedures when the voice storage module (VM) 25 is in a system-down state or in a congestion state.

In the sequence shown in FIG. 11, it is assumed that a call from the mobile station (MS) 20 (or any fixed station) to a subscriber was made to the voice storage system and no response from the called subscriber was timely received.

After the occurrence of such events, the sequence of voice message recording procedures is started in order to record a voice message from the mobile station (MS) 20 in the voice storage system.

In response to the call from the MS 20, the mobile transit switch (MTS) 23 receives the activity ratio of each of the voice storage modules (VM) 25 (for example, "VM1", "VM2" and "VM3") from the home location register (HLR) 35. The MTS 23 selects one (for example, "VM2") of the three voice storage modules 25 in accordance with the smallest activity ratio among the activity ratios of the voice storage modules 25 from the HLR 35.

The MTS 23 issues a connection request to the voice storage module (VM2) 25 with the smallest activity ratio. However, the voice storage module (VM2) 25 is in a system-down state, in a congestion station or in a busy condition. For example, when the VM2 is in a busy condition, a notification of the busy condition of the VM2 is sent to the MTS 23. As a result, the connection between the MS and the VM2 is incomplete.

When the connection of the MS 20 to the VM2 25 cannot be performed, the MTS 23 again receives the activity ratios of the voice storage modules (VM) 25 from the HLR 35. The MTS 23 selects one (for example, "VM3") of the voice storage modules 25 in accordance with the second smallest activity ratio.

The MTS issues a connection request to the voice storage module (VM3) 25 with the second smallest activity ratio.

In response to the connection request, the voice storage module (VM3) 25 generates a management number of the voice message. The management number of the voice message is converted into a normalized number, and the normalized number of the voice message from the VM3 25 is stored in the home location register (HLR) 35.

After the connection of the MS to the VM3 is performed, the voice message from the mobile station (MS) 20 is recorded in the selected voice storage module (VM3) 25.

After the voice message recording is carried out, the communication line between the mobile station (MS) 20 and the mobile transit switch (MTS) 23 is disconnected. The sequence of the voice message recording procedures shown in FIG. 11 ends.

Figure 12:
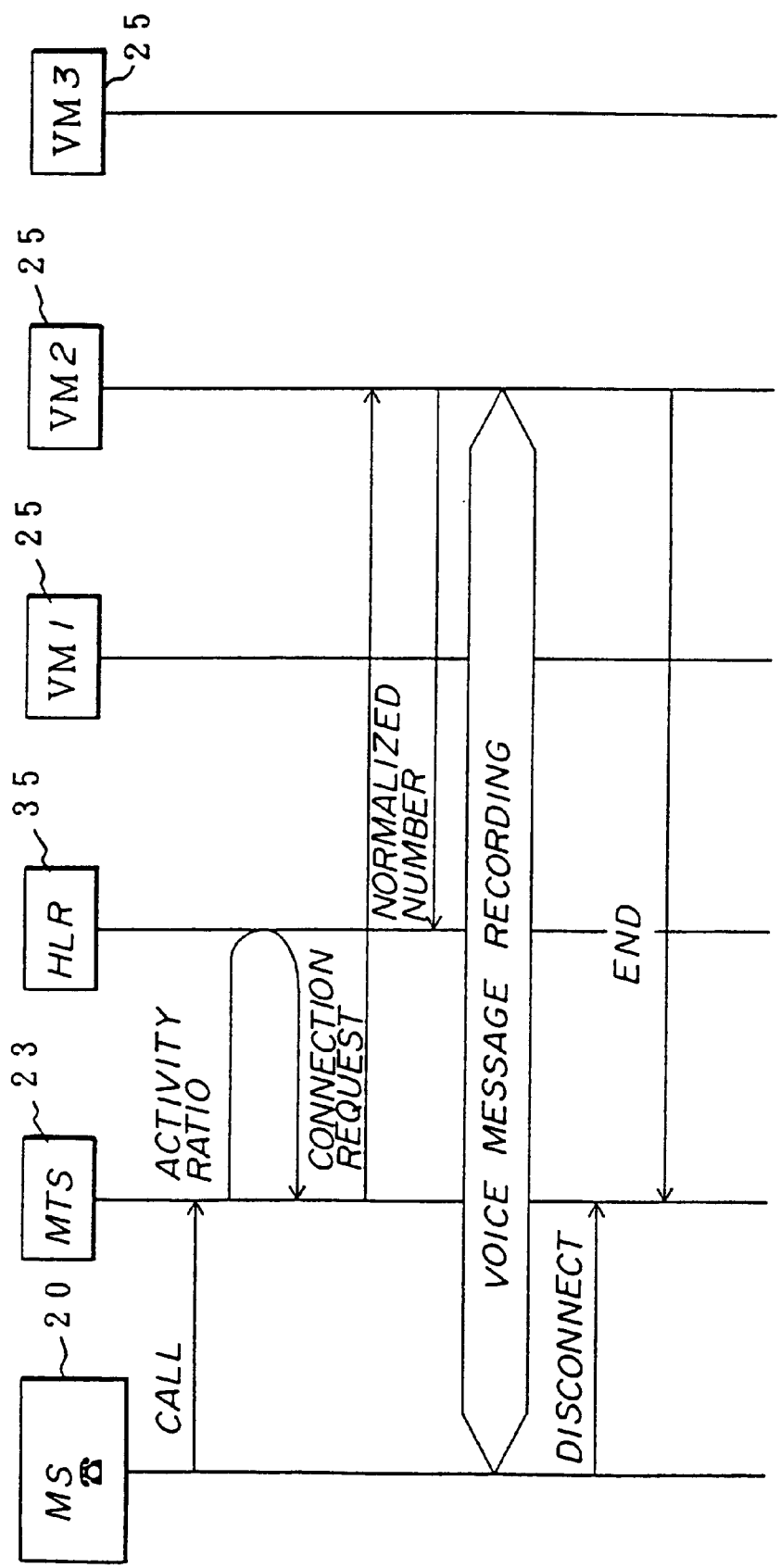
Figure 13:
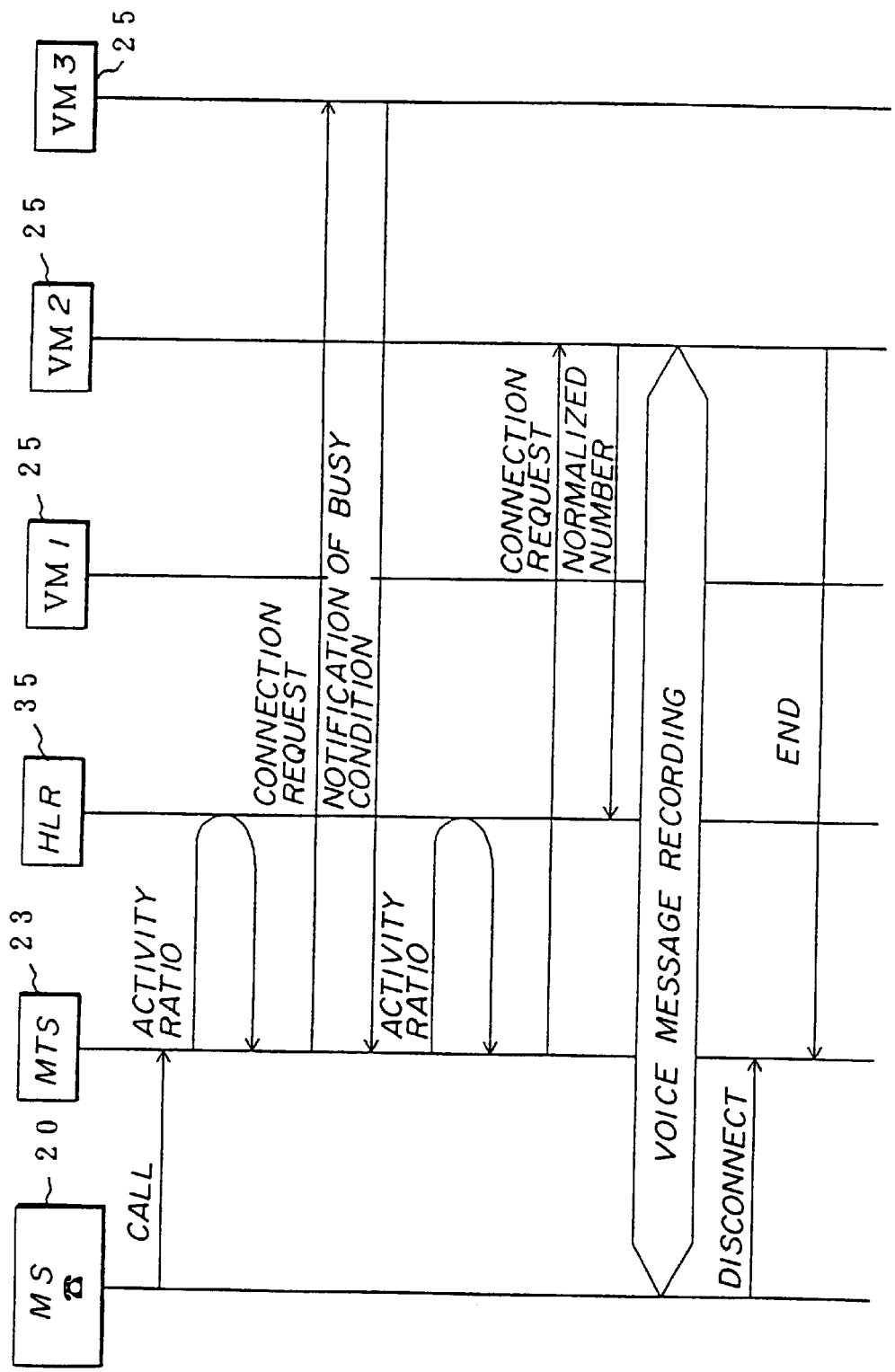

FIG. 12 shows a sequence of voice message recording procedures performed in the embodiment of FIG. 13 when a notification that the voice storage module (VM3) with the smallest activity ratio is currently in a system-down state or in a congestion state is already sent to the home location register (HLR).

In the sequence shown in FIG. 12, it is assumed that a call from the mobile station (MS) 20 (or any fixed station) to a subscriber was made to the voice storage system and no response from the called subscriber was timely received. After the occurrence of such events, the sequence of voice message recording procedures is started in order to record a voice message from the mobile station (MS) 20 in the voice storage system.

In response to the call from the MS 20, the mobile transit switch (MTS) 23 receives the activity ratio of each of the voice storage modules (VM) 25 (for example, "VM1" and "VM2" except "VM3") from the home location register (HLR) 35. As the VM3 25 is currently in the system-down state or in the congestion state, the MTS 23 selects one (for example, "VM2") of the voice storage modules 25 in accordance with the smallest activity ratio among the activity ratios of the voice storage modules 25 which are currently not in a system-down state or a congestion state.

The MTS 23 issues a connection request to the voice storage module (VM2) 25 with the second smallest activity ratio.

In response to the connection request, the voice storage module (VM2) 25 generates a management number of the voice message. The management number of the voice message is converted into a normalized numbers and the normalized number of the voice message from the VM2 25 is stored in the home location register (HLR) 35.

After the connection of the MS to the VM2 is performed, the voice message from the mobile station (MS) 20 is recorded in the selected voice storage module (VM2) 25.

After the voice message recording is carried out, the communication line between the mobile station (MS) 20 and the mobile transit switch (MTS) 23 is disconnected. The sequence of the voice message recording procedures shown in FIG. 12 ends.

Accordingly even when the voice storage module (VM3) with the smallest activity ratio is in a system-down state or in a congestion state, the voice storage system of the present invention can successfully carry out the recording of the voice message from the mobile station (MS) 20 in the selected voice storage module (VM2) among the plurality of the voice storage modules 25.

FIG. 13 shows a sequence of voice message recording procedures when a notification that the VM3 25 with the smallest activity ratio is in a busy condition is sent to the MTS 23 after the connection request to the VM3 25 is made by the MTS 23.

In the sequence shown in FIG. 13, it is assumed that a call from the mobile station (MS) 20 (or any fixed station) to a subscriber was made to the voice storage system and no response from the called subscriber was timely received. After the occurrence of such events, the sequence of voice message recording procedures shown in FIG. 13 is started in order to record a voice message from the mobile station (MS) 20 in the voice storage system.

In response to the call from the MS 20, the mobile transit switch (MTS) 23 receives the activity ratio of each of the voice storage modules (VM) 25 (for example, the VM1, the VM2, and the VM3) from the home location register (HLR) 35. It is assumed that these voice storage modules VM1, VM2 and VM3 are not in a system-down state or in a congestion state. The MTS 23 selects one (for example, the VM3) of the voice storage modules 25 in accordance with the smallest activity ratio.

The MTS 23 issues a connection request to the voice storage module (VM3) 25 having the smallest activity ratio. In the sequence shown in FIG. 13, however, the MTS 23 receives from the VM3 25 a notification that the VM3 25 is currently in a busy condition. As a result, the connection of the MTS 23 to the VM3 25 cannot be performed.

Again, the MTS 23 receives the activity ratio of each of the voice storage modules VM1 and VM2 from the HLR 35. The MTS 23 selects one (for example, the VM2) of the voice storage modules 25 in accordance with the smallest activity ratio. The MTS 23 issues a connection request to the VM2 25 which actually has the second smallest activity ratio.

In response to the connection request, the voice storage module (VM2) 25 generates a management number of the voice message. The management number of the voice message is converted into a normalized number, and the normalized number of the voice message from the VM2 25 is stored in the home location register (HLR) 35.

After the connection of the MS to the VM2 is performed, the voice message from the mobile station (MS) 20 is recorded in the selected voice storage module (VM2) 25.

After the voice message recording is carried out, the communication line between the mobile station (MS) 20 and the mobile transit switch (MTS) 23 is disconnected. The sequence of the voice message recording procedures shown in FIG. 13 ends.

Accordingly, when the voice storage module (VM3) with the smallest activity ratio is in the busy condition, the voice storage system of the present invention can successfully carry out the recording of the voice message from the mobile station (MS) 20 in the selected voice storage module (VM2). The recording of the voice message in the "busy-condition" voice storage module (VM3) is avoided.

Figure 14:
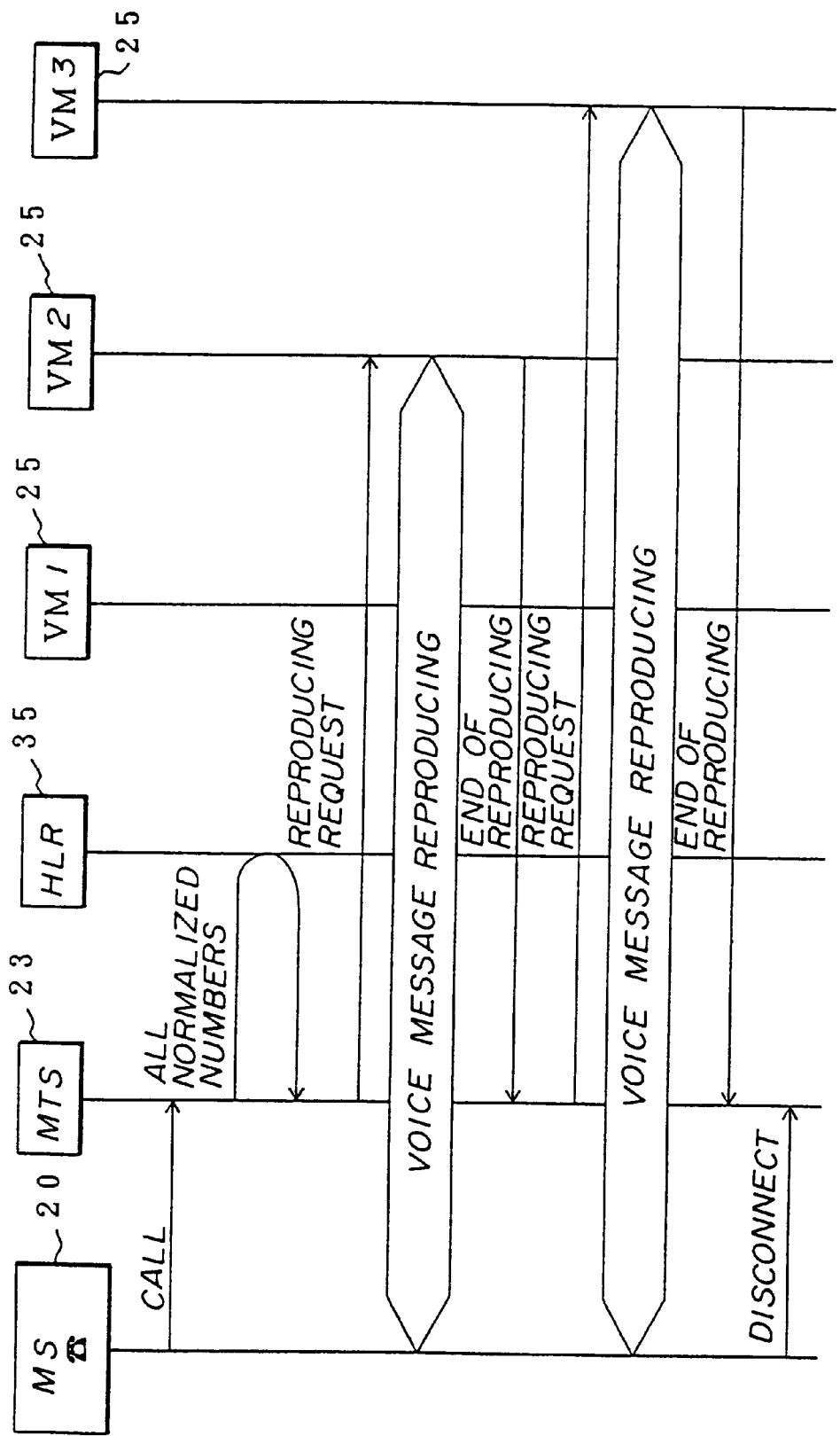
FIGS. 14 through 17 are diagrams for explaining various sequences of voice message reproducing procedures performed in one embodiment of the present invention.

FIG. 14 shows a sequence of voice message reproducing procedures performed in one embodiment of the present invention when all the voice storage modules (VM) are in a normal condition. Throughout the sequence, the voice storage modules (VM) 25 are not in a system-down state, in a congestion state or in a busy condition.

In the sequence shown in FIG. 14, it is assumed that a reproducing request call from a mobile station (MS) 20 (or any fixed station) was made to the voice storage system.

In response to the reproducing request call from the MS 20, the mobile transit switch (MTS) 23 issues an inquiry to the home location register (HLR) 35 and receives all the normalized numbers related to the subscriber identification number (included in the reproducing request call), from the home location register (HLR) 35. The MTS 23 sorts the normalized numbers in order of the voice message recording time. The MTS 23 issues a reproducing request to one (for example, the VM2) of the voice storage modules 25, which is identified by the MTS 23 by the VM number included in the first one among the sorted normalized numbers.

In response to the reproducing request from the MTS, the voice message module VM2 reproduces a voice message identified by the management number which corresponds to the subscriber identification number of the reproducing request and to the voice message recording time of the normalized number, and transports the voice message to the calling mobile station (MS) 20 via the mobile transit switch 23.

After the reproduction of the voice message with respect to the first normalized number is performed by the VM2 the MTS 23 issues a reproducing request to another (for example, the VM3) of the voice storage modules 25, which is identified by the MTS 23 by the VM number included in the second normalized number among the sorted normalized numbers.

Similarly to the above procedures of the VM2, the voice storage module VM3 reproduces a corresponding voice message and transports the voice message to the calling mobile station (MS).

After the reproduction of the voice messages with respect to all the normalized numbers is carried out, the communication line between the mobile station (MS) 20 and the mobile transit switch (MTS) 23 is disconnected. The sequence of the voice message reproducing procedures shown in FIG. 14 ends.

Accordingly, when a reproducing request call from a subscriber on the mobile station is made, the voice storage system of the present invention collects all the voice storage management information related to the calling subscriber from the home location register (HLR) at one time, and it is possible to reduce the number of accesses which must be given by the mobile transit switch (MTS) to the home location register (HLR).

Figure 15:
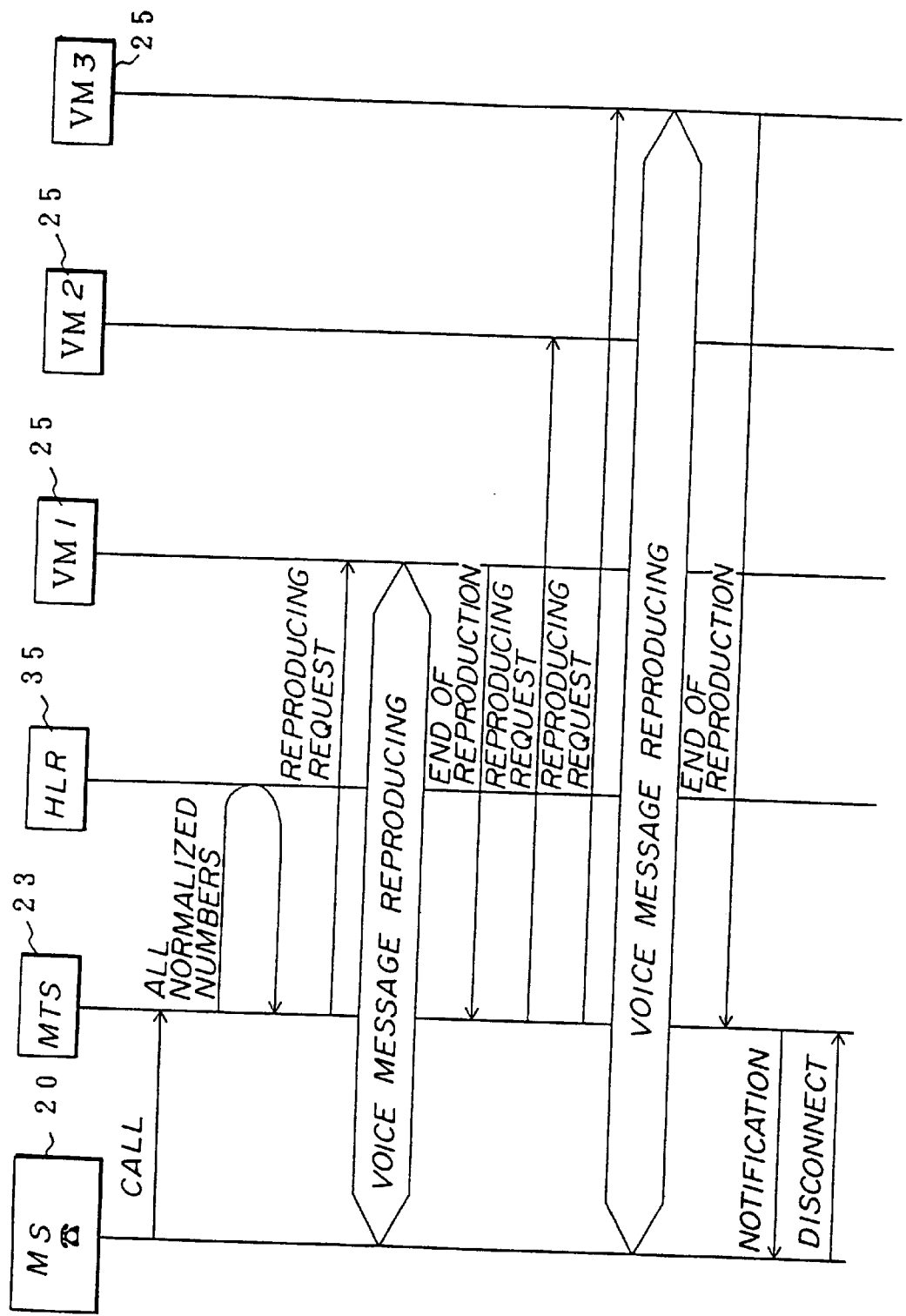

FIG. 15 shows a sequence of voice message reproducing procedures when the voice storage module (VM2) is in a system-down state or in a congestion state.

In the sequence shown in FIG. 15, it is assumed that a reproducing request call from a mobile station (MS) 20 (or any fixed station) was made to the voice storage system.

In response to the reproducing request call from the MS 20, the mobile transit switch (MTS) 23 issues an inquiry to the home location register (HLR) 35, and receives all the normalized numbers related to the subscriber identification number (included in the reproducing request call), from the home location register (HLR) 35. The MTS 23 sorts the normalized numbers in order of the voice message recording time. The MTS 23 issues a reproducing request to one (for example, the VM1) of the voice storage modules 25, which is identified by the MTS 23 by the VM number included in the first one among the sorted normalized numbers.

In response to the reproducing request from the MTS 23, the voice message module VM1 reproduces a voice message identified by the management number which corresponds to the subscriber identification number of the reproducing request and to the voice message recording time of the normalized number, and transports the voice message to the mobile station (MS) 20 via the mobile transit switch 23.

After the reproduction of the voice message with respect to the first normalized number is performed by the VM1, the MTS 23 issues a reproducing request to another (for example, the VM2) of the voice storage modules 25, which is identified by the MTS 23 by the VM number included in the second one among the sorted normalized numbers.

Since the voice storage module VM2 is in the system-down state or in the congestion state, the connection of the MTS and the VM2 cannot be performed. Thus, the MTS 23 issues a reproducing request to another (for examples the VM3) of the voice storage modules 25. This voice storage module (VM3) 25 is identified by the MTS 23 by the VM number included in the third normalized number (following the second normalized number) among the sorted normalized numbers.

Similarly to the above procedures of the VM1, the voice storage module VM3 reproduces a corresponding voice message and transports the voice message to the calling MS 20 via the MTS 23.

After the reproduction of the voice messages with respect to all the normalized numbers from the HLR 35 is carried out, the mobile transit station (MTS) 23 sends to the mobile station (MS) 20 a notification that there was a voice message which was not able to be reproduced by the VM2. After the notification is sent to the MS 20, the communication line between the mobile station (MS) 20 and the mobile transit switch (MTS) 23 is disconnected, and the sequence of the voice message reproducing procedures shown in FIG. 15 ends.

Accordingly, when the voice storage module (VM2) is in a system-down state or in a congestion state, the voice storage system of the present invention can successfully reproduce the voice messages in the voice storage modules VM1 and VM3. The reproducing of the voice message in the "down" or "congesting" voice storage module VM2 is avoided, and a notification of the presence of the non-reproduced voice message is sent to the mobile station. This enables, after the receipt of the notification from the voice storage, system, the calling subscriber to take action such as making a reproducing request call to the MTS 23 in order to issue a reproducing request to the VM2 again.

Figure 16:
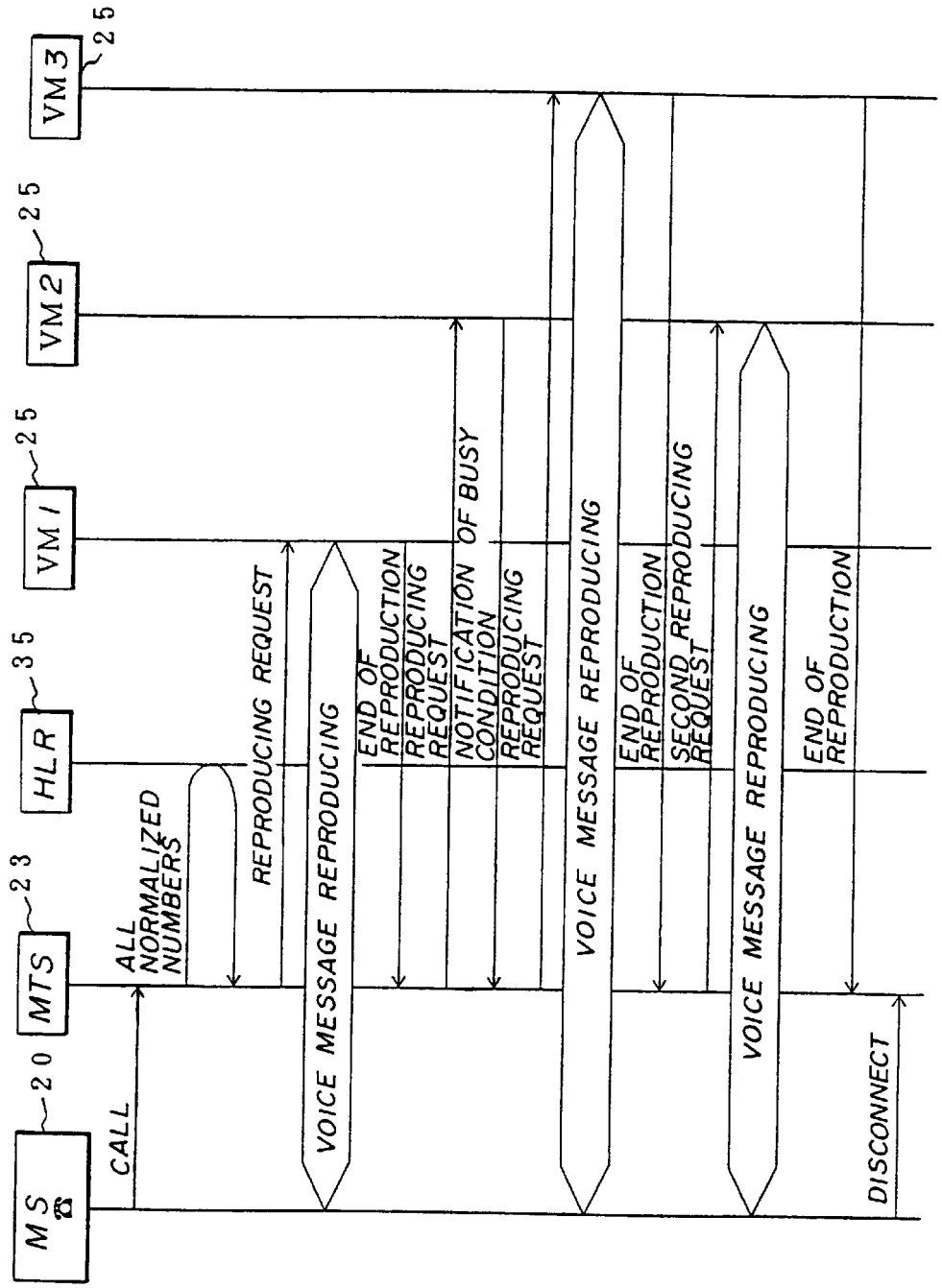

FIG. 16 shows a sequence of voice message reproducing procedures when the voice storage module (VM2) is in a busy condition.

In the sequence shown in FIG. 16, it is assumed that a reproducing request call from a mobile station (MS) 20 (or any fixed station) was made to the voice storage system.

In response to the reproducing request call from the MS 20, the mobile transit switch (MTS) 23 issues an inquiry to the home location register (HLR) 35, and receives all the normalized numbers related to the subscriber identification number (included in the reproducing request call), from the home location register (HLR) 35. The MTS 23 sorts the normalized numbers in order of the voice message recording time. The MTS 23 issues a reproducing request to one (for example, the VM1) of the voice storage modules 25, which is identified by the MTS 23 by the VM number included in the first one among the sorted normalized numbers.

In response to the reproducing request from the MTS 23, the voice message module VM1 reproduces a voice message identified by the management number which corresponds to the subscriber identification number of the reproducing request and to the voice message recording time of the first normalized number, and transports the voice message to the mobile station (MS) 20 via the mobile transit switch 23.

After the reproduction of the voice message with respect to the first normalized number is performed by the VM1, the MTS 23 issues a reproducing request to another (for example, the VM2) of the voice storage modules 25, which is identified by the MTS 23 by the VM number included in the second normalized number.

Since the voice storage module VM2 is in the busy condition, the connection of the MTS and the VM2 cannot be performed. The voice storage module VM2 sends to the mobile transit switch (ITS) 23 a notification that the VM2 is currently in the busy condition.

After the notification from the VM2 is received, the MTS 23 issues a reproducing request to another (for example, the VM3) of the voice storage modules 25, which is identified by the MTS 23 by the VM number included in the third normalized number.

Similarly to the above procedures of the VM1, the voice storage module VM3 reproduces a corresponding voice message and transports the voice message to the mobile station MS 20 via the MTS 23.

After the reproduction of the voice messages with respect to all the normalized numbers from the HLR 35 is carried out, the mobile transit switch (ITS) 23 issues a second reproducing request to the busy-condition voice storage module VM2.

If the VM2, upon the issue of the second reproducing request, is not in the busy condition, the VM2 reproduces a corresponding voice message and transports the voice message to the mobile station (MS) 20. After the reproduction of the voice message is carried out, the connection of the MS 20 and the MTS 23 is disconnected, and the sequence of the voice message reproducing procedures shown in FIG. 16 ends.

Figure 17:
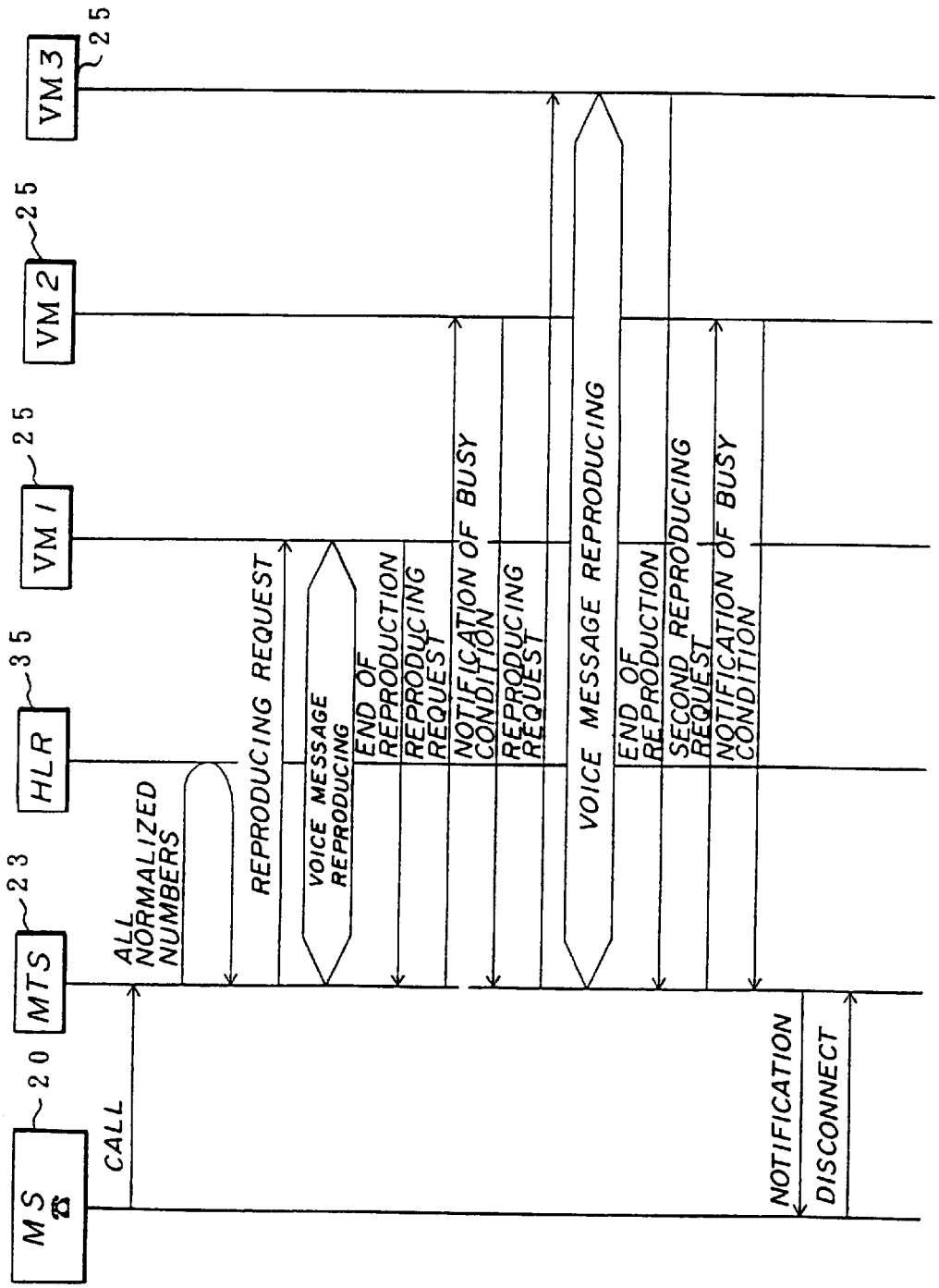

FIG. 17 shows a sequence of voice message reproducing procedures when a second reproducing request to the busy-condition voice storage module (VM2) is issued but the voice storage module (VM2) is still in the busy condition.

The sequence of voice message reproducing procedures prior to the issue of the second reproducing request in FIG. 17 is the same as the sequence in FIG. 16. In the sequence shown in FIG. 17, the VM2, upon the issue of the second reproducing request, is still in the busy condition. A notification that the VM2 is currently in the busy condition is sent from the VM2 to the MTS 23 again.

In response to the notification from the VM2, the mobile transit switch (MTS) 23 sends to the mobile station (MS) 20 a notification that there was a voice message which was not able to be reproduced by the VM2. After the notification from the MTS 23 is sent to the MS 20, the communication line between the MS 20 and the MTS 23 is disconnected, and the sequence of the voice message reproducing procedures shown in FIG. 17 ends.

Accordingly, when the voice storage module (VM2) is in a busy condition, the voice storage system of the present invention issues a second reproducing request to the busy-condition voice storage module VM2 after the reproduction of the other voice messages by the other voice storage modules 25 is carried out. If the VM2 is not in a busy condition upon the issue of the second reproducing request, the reproduction of the voice message in question by the VM2 is carried out thereafter. If the VM2 is still in the busy condition, the reproduction of the voice message in question by the VM2 is avoided.

Figure 18:
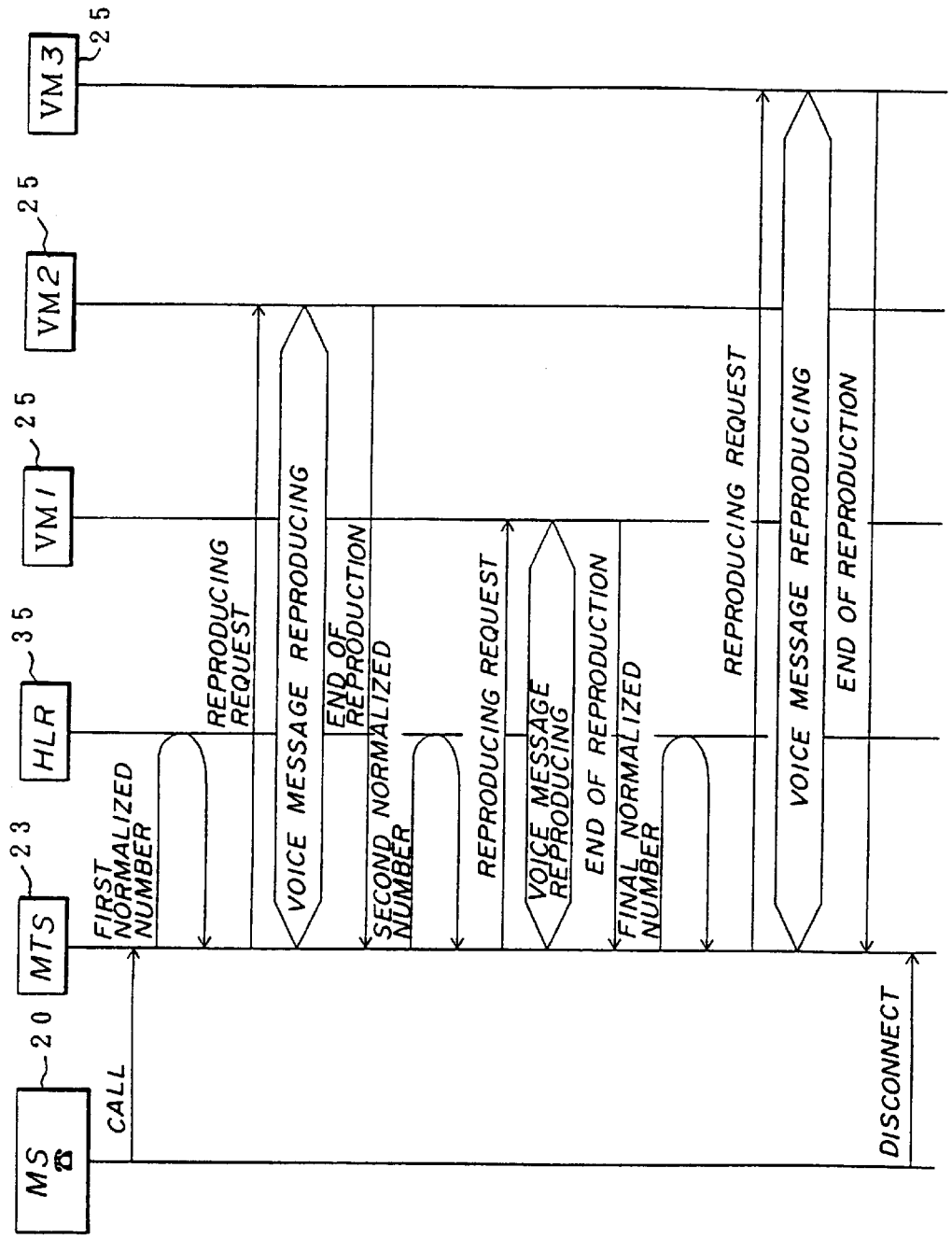
FIGS. 18 through 21 are diagrams for explaining various sequences of voice message reproducing procedures performed in another embodiment of the present invention.

FIG. 18 shows a sequence of voice message reproducing procedures performed in another embodiment of the present invention when all the voice storage modules (VM) 25 are in a normal condition. Throughout the sequence, the voice storage modules (VM) 25 are not in a system-down state, in a congestion state or in a busy condition.

In the sequence shown in FIG. 18, it is assumed that a reproducing request call from a mobile station (MS) 20 (or any fixed station) was made to the voice storage system.

In this embodiment, the mobile transit switch (MTS) 23 issues an inquiry to the home location register (HLR) 35, and receives one by one the normalized numbers related to the subscriber identification number (included in the reproducing request call) in order of the voice message recording time, from the home location register (HLR) 35.

In response to the reproducing request call from the MS 20, the MTS receives a first normalized number related to the subscriber identification number. The MTS 23 issues a reproducing request to one (for example, the VM2) of the voice storage modules 25, which is identified by the MTS 23 by the VM number included in the first normalized number.

In response to the reproducing request from the MTS, the VM2 reproduces a voice message identified by the management number which corresponds to the subscriber identification number of the reproducing request and to the voice message recording time of the first normalized number, and transports the voice message to the mobile station (MS) 20 via the mobile transit switch (MTS) 23.

After the reproduction of the voice message with respect to the first normalized number is performed by the VM2 the MTS 23 receives a second normalized number from the HLR 35 and issues a reproducing request to another (for example, the VM1) of the voice storage modules 25, which is identified by the MTS 23 by the VM number included in the second normalized number.

Similarly to the above procedures of the VM2, the voice storage module VM1 reproduces a corresponding voice message and transports the voice message to the calling mobile station (MS).

After the reproduction of the voice message with respect to the final normalized number is carried out, the communication line between the MS 20 and the MTS 23 is disconnected. The sequence of the voice message reproducing procedures shown in FIG. 18 ends.

Figure 19:
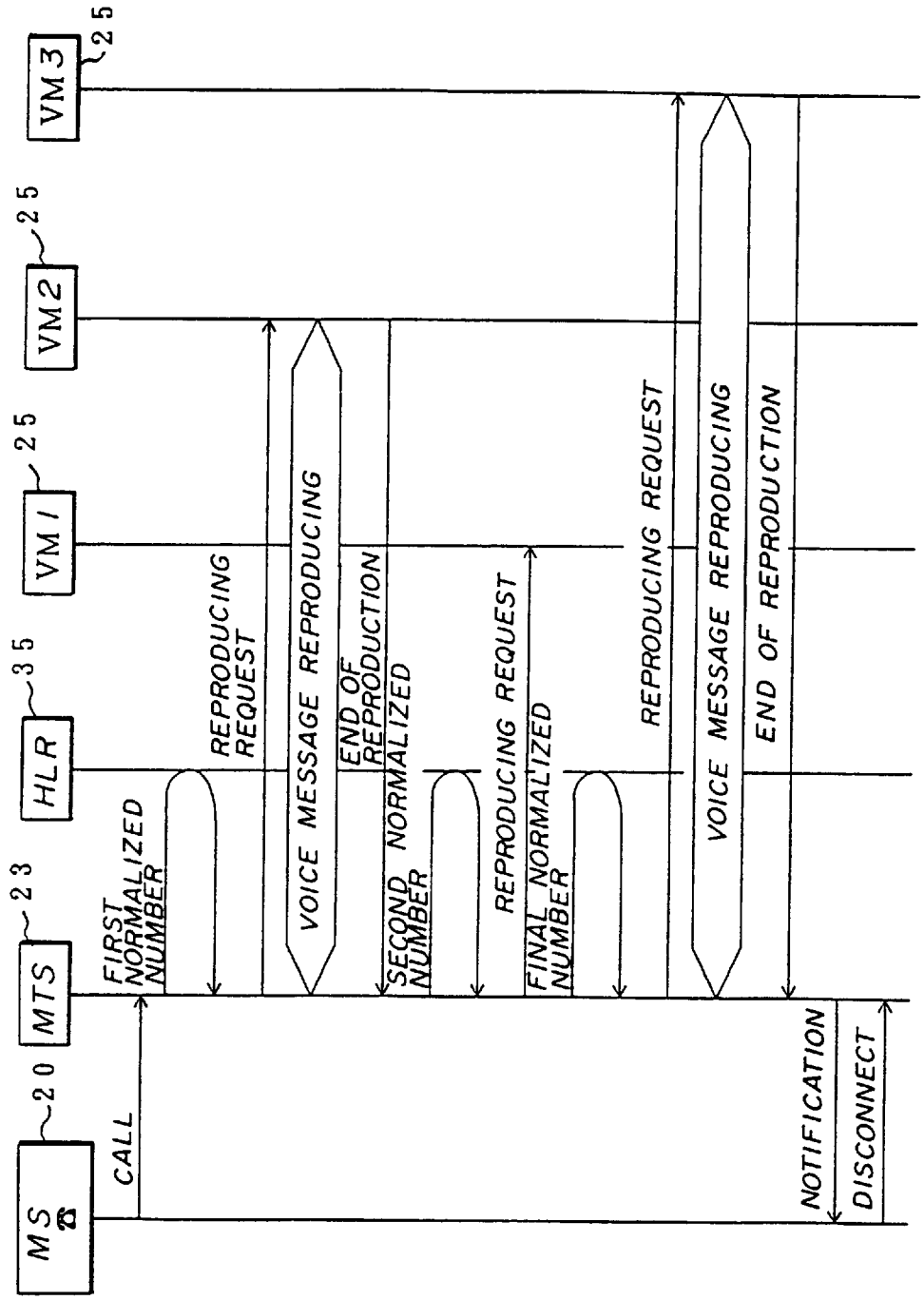

FIG. 19 shows a sequence of voice message reproducing procedures performed in the embodiment of FIG. 18 when the voice storage module (VM1) is in a system-down state or in a congestion state.

In the sequence shown in FIG. 19, it is assumed that a reproducing request call from a mobile station (MS) 20 (or any fixed station) was made to the voice storage system. Similarly to the embodiment of FIG. 18, the MTS 23 in FIG. 19 receives one by one the normalized numbers related to the subscriber identification number (included in the reproducing request call) in order of the voice message recording time, from the home location register (HLR) 35.

In response to the reproducing request call from the MS 20, the MTS 23 receives a first normalized number related to the subscriber identification number. The MTS 23 issues a reproducing request to one (for examples the VM2) of the voice storage modules 25, which is identified by the MTS 23 by the VM number included in the first normalized number.

In response to the reproducing request from the MTS, the VM2 reproduces a voice message identified by the management number which corresponds to the subscriber identification number of the reproducing request and to the voice message recording time of the first normalized number, and transports the voice message to the calling mobile station (MS) 20 via the mobile transit switch (MTS) 23.

After the reproduction of the voice message with respect to the first normalized number is performed by the VM2, the MTS 23 receives a second normalized number from the HLR 35 and issues a reproducing request to another (for example, the VM1) of the voice storage modules 25, which is identified by the MTS 23 by the VM number included in the second normalized number.

Since the VM1 is currently in the system-down state or in the congestion state, the connection of the MTS 23 and the VM1 cannot be performed. Again, the MTS 23 receives a final normalized number (following the second normalized number) from the HLR 35 and issues a reproducing request to another (for example, the VM3) of the voice storage modules 25. This voice storage module (VM3) is identified by the MTS 23 by the VM number included in the final normalized number from the HLR 35.

Similarly to the above procedures of the VM2, the voice storage module VM3 reproduces a corresponding voice message and transports the voice message to the calling mobile station (MS).

After the reproduction of the voice message with respect to the final normalized number is carried out, the MTS 23 sends to the MS 20 a notification that there was a voice message which was not able to be reproduced by the VM1. After the notification from the MTS 23 is sent to the MS 20, the communication line between the MS 20 and the MTS 23 is disconnected. The sequence of the voice message reproducing procedures shown in FIG. 19 ends.

Figure 20:
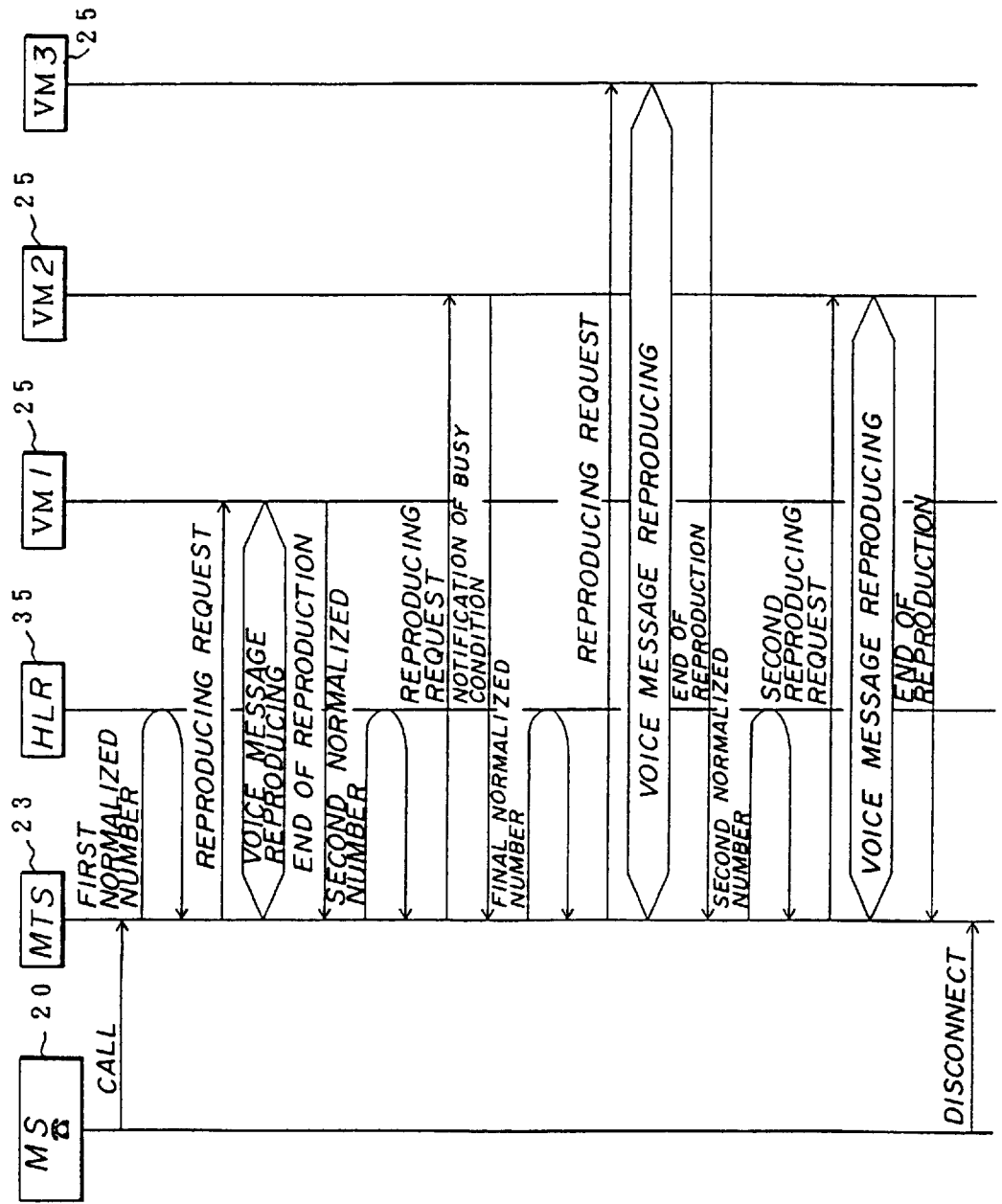

FIG. 20 shows a sequence of voice message reproducing procedures performed in the embodiment of FIG. 18 when the voice storage module (VM1) is in a busy condition.

In the sequence shown in FIG. 20, it is assumed that a reproducing request call from a mobile station (MS) 20 (or any fixed station) was made to the voice storage system. Similarly to the embodiment of FIG. 18, the MTS 23 in FIG. 19 receives one by one the normalized numbers related to the subscriber identification number (included in the reproducing request call) in order of the voice message recording time, from the home location register (HLR) 35.

In response to the reproducing request call from the MS 20, the MTS 23 receives a first normalized number related to the subscriber identification number. The MTS 23 issues a reproducing request to one (for example, the VM1) of the voice storage modules 25, which is identified by the VM number included in the first normalized number.

In response to the reproducing request from the MTS, the VM1 reproduces a voice message identified by the management number which corresponds to the subscriber identification number of the reproducing request and to the voice message recording time of the first normalized number, and transports the voice message to the calling mobile station (MS) 20.

After the reproduction of the voice message with respect to the first normalized number is performed by the VM1, the MTS 23 receives a second normalized number from the HLR 35 and issues a reproducing request to another (for example, the VM2) of the voice storage modules 25 which is identified by the VM number included in the second normalized number.

Since the VM2 is currently in the busy condition, the connection of the MTS 23 and the VM2 cannot be performed. The VM2 sends to the MTS 23 a notification that the VM2 is currently in the busy condition. In addition, the MTS 23 allows the HLR 35 to store the second normalized number of the busy-condition voice storage module VM2 therein.

After the notification from the VM2 is received the MTS 23 receives a final normalized number from the HLR 35 and issues a reproducing request to another (for example, the VM3) of the voice storage modules 25, which is identified by the VM number included in the final normalized number.

Similarly to the above procedures of the VM1, the voice storage module VM3 reproduces a corresponding voice message and transports the voice message to the mobile station (MS) 20.

After the reproduction of the voice message with respect to the final normalized number is carried out, the MTS 23 receives the second normalized number from the HLR 35 again and issues a second reproducing request to the VM2 which is identified by the VM number included in the second normalized number.

If the VM2 is not in the busy condition upon the issue of the second reproducing request, the VM2 reproduces a corresponding voice message and transports the voice message to the MS 20.

After the reproduction of the voice message with respect to the second normalized number is carried out, the communication line between the MS 20 and the MTS 23 is disconnected. The sequence of the voice message reproducing procedures shown in FIG. 20 ends.

Figure 21:
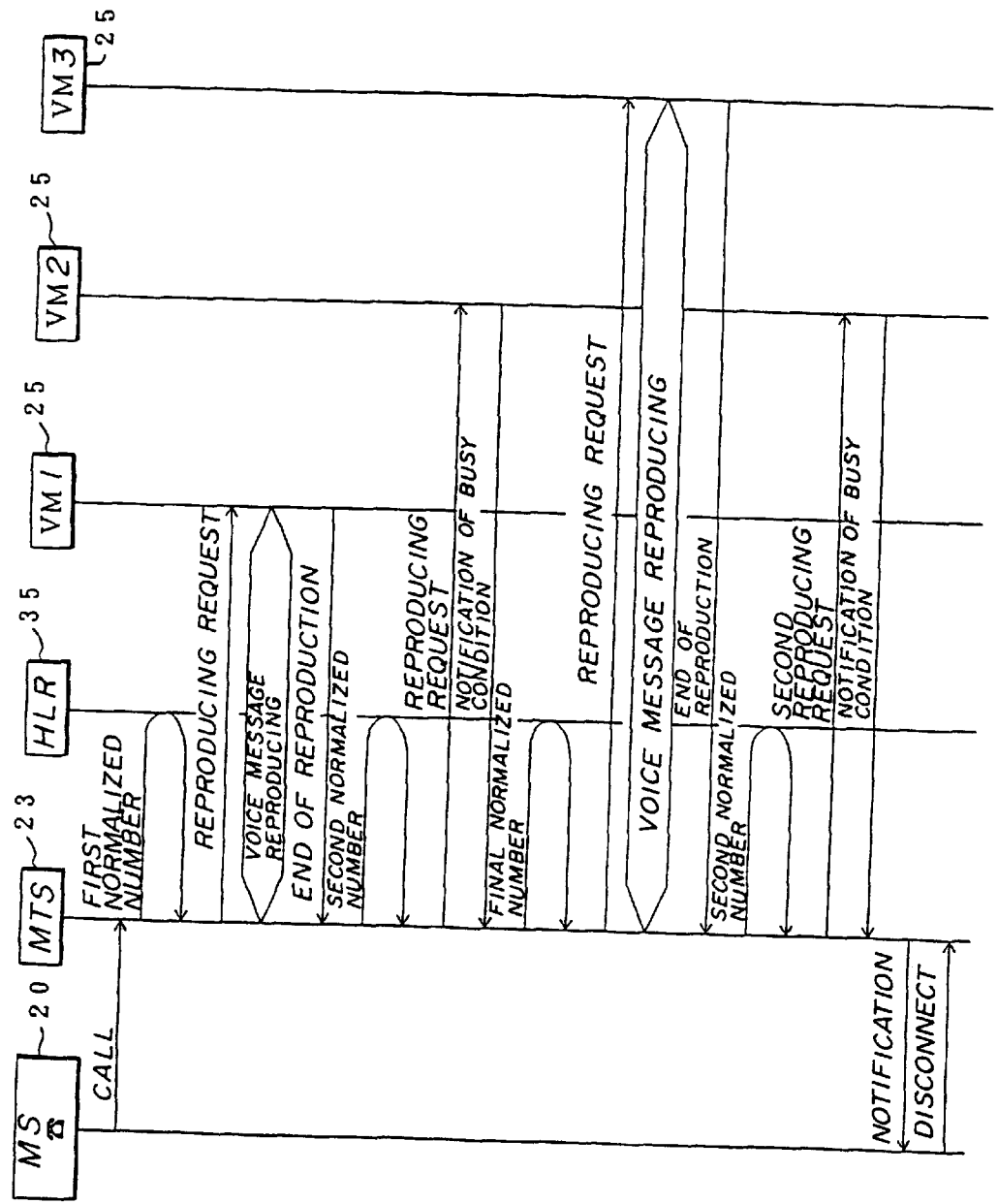

FIG. 21 shows a sequence of voice message reproducing procedures performed in the embodiment of FIG. 18 when a second reproducing request to the busy-condition voice storage module (VM2) is issued but the voice storage module (VM2) is still in the busy condition.

The sequence of voice message reproducing procedures prior to the issue of the second reproducing request in FIG. 21 is the same as the sequence in FIG. 20. In the sequence shown in FIG. 21, the VM2 is still in the busy condition upon the issue of the second reproducing request. A notification that the VM2 is in the busy condition is sent from the VM2 to the MTS 23 again.

In response to the notification from the VM2, the mobile transit switch (MTS) 23 sends to the mobile station (MS) 20 a notification that there was a voice message which was not able to be reproduced by the VM2. After the notification from the MTS 23 is sent to the MS 20, the communication line between the MS 20 and the MTS 23 is disconnected, and the sequence of the voice message reproducing procedures shown in FIG. 21 ends.

Figure 22:
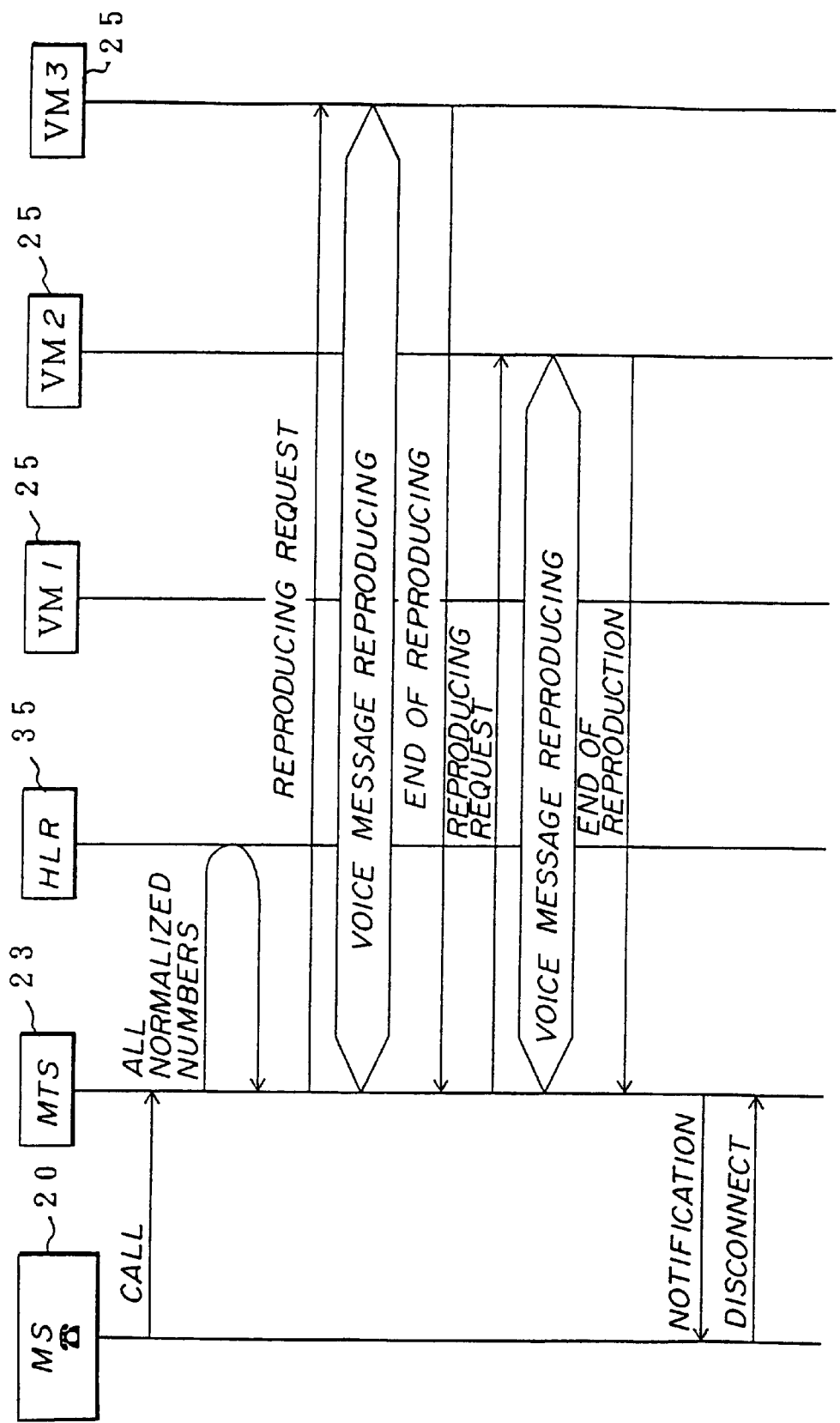
FIGS. 22 through 24 are diagrams for explaining other sequences of voice message reproducing procedures performed in the embodiment of FIG. 14.

FIG. 22 shows a sequence of voice message reproducing procedures performed in the embodiment of FIG. 14 when a notification that the voice storage module (VM1) is in a system-down state or in a congestion state is already sent to the home location register (HLR).

In the sequence shown in FIG. 22, it is assumed that a reproducing request call from a mobile station (MS) 20 (or any fixed station) was made to the voice storage system.

In response to the reproducing request call from the MS 20, the mobile transit switch (MTS) 23 issues an inquiry to the home location register (HLR) 35 and receives all the normalized numbers related to the subscriber identification number included in the reproducing request calls from the home location register (HLR) 35. The MTS 23 sorts the normalized numbers in order of the voice message recording time. The MTS 23 issues a reproducing request to one (for example, the VM3) of the voice storage modules 25, which is identified by the VM number included in the first one among the sorted normalized numbers. The MTS 23 select the above one of the voice storage modules 25 which is different from the voice storage module (VM1) currently in the system-down state or in the congestion state.

In response to the reproducing request from the MTS 23, the voice message module VM3 reproduces a voice message identified by the management number which corresponds to the subscriber identification number of the reproducing request and to the voice message recording time of the normalized number, and transports the voice message to the calling mobile station (MS) 20 via the mobile transit switch 23.

After the reproduction of the voice message with respect to the first normalized number is performed by the VM3, the MTS 23 issues a reproducing request to another (for example, the VM2) of the voice storage modules 25, which is identified by the VM number included in the second normalized number among the sorted normalized numbers. The MTS 23 selects the above another of the voice storage modules 25 which is different from the voice storage module (VM1) currently in the system-down state or in the congestion state.

Similarly to the above procedures of the VM3, the voice storage module VM2 reproduces a corresponding voice message and transports the voice message to the mobile station (MS) 20 via the MTS 23.

After the reproduction of the voice messages with respect to all the normalized numbers is carried out, the MTS 23 sends to the MS 20 a notification that there was a voice message which was not able to be reproduced by the VM1. After the notification from the MTS 23 is sent to the MS 20, the communication line between the mobile station (MS) 20 and the mobile transit switch (MTS) 23 is disconnected. The sequence of the voice message reproducing procedures shown in FIG. 22 ends.

Figure 23:
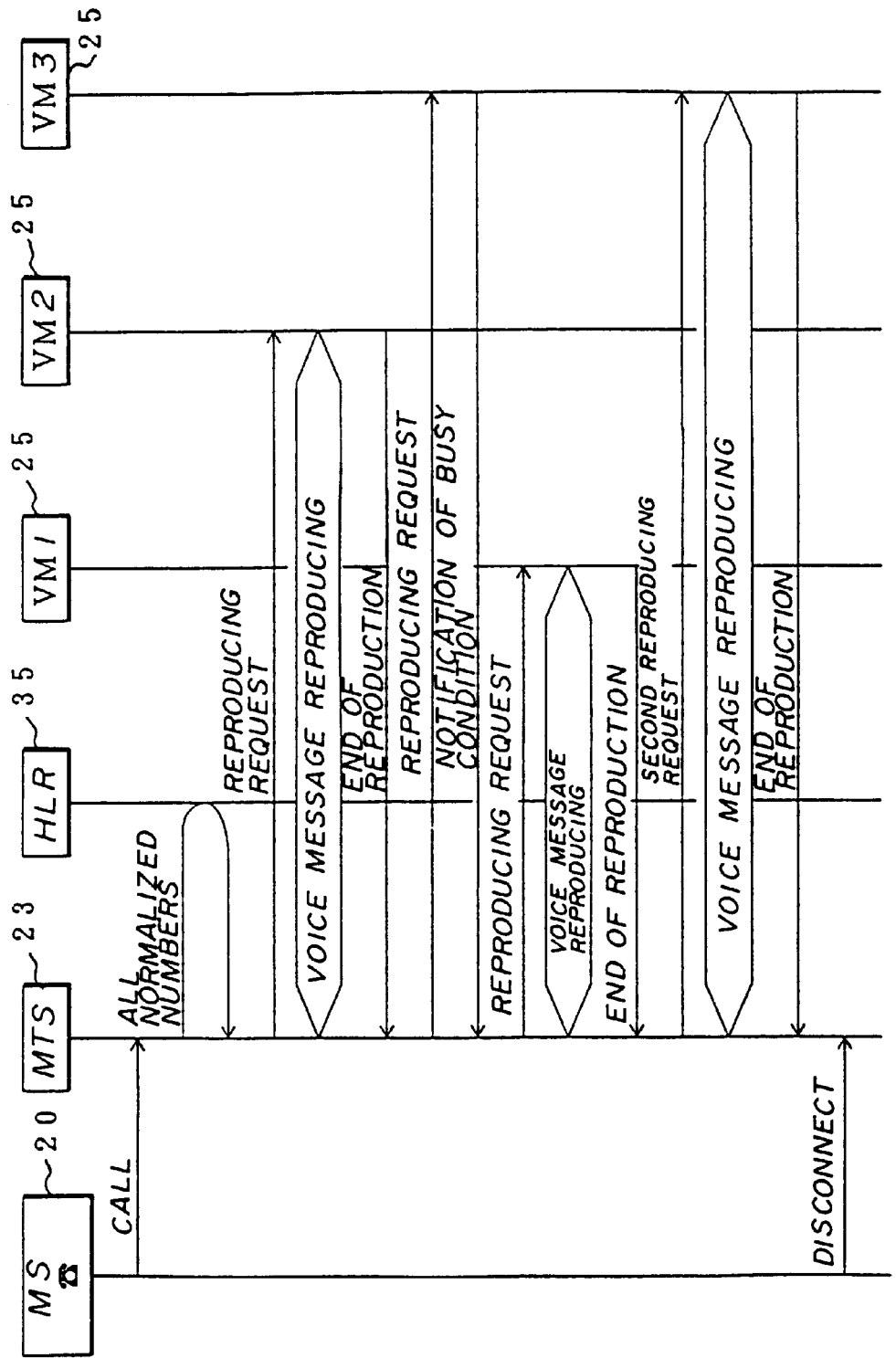

FIG. 23 shows a sequence of voice message reproducing procedures performed in the embodiment of FIG. 14 when the voice storage module (VM3) is in a busy condition.

In the sequence shown in FIG. 23, it is assumed that a reproducing request call from a mobile station (MS) 20 (or any fixed station) was made to the voice storage system.

In response to the reproducing request call from the MS 20, the mobile transit switch (MTS) 23 issues an inquiry to the home location register (HLR) 35, and receives all the normalized numbers related to the subscriber identification number included in the reproducing request call, from the home location register (HLR) 35. The MTS 23 sorts the normalized numbers in order of the voice message recording time. The MTS 23 issues a reproducing request to one (for example, the VM2) of the voice storage modules 25 which is identified by the VM number included in the first one among the sorted normalized numbers.

In response to the reproducing request from the MTS 23, the voice message module VM2 reproduces a voice message identified by the management number which corresponds to the subscriber identification number of the reproducing request and to the voice message recording time of the first normalized number, and transports the voice message to the mobile station (MS) 20 via the mobile transit switch 23.

After the reproduction of the voice message with respect to the first normalized number is performed by the VM2, the MTS 23 issues a reproducing request to another (for example, the VM3) of the voice storage modules 25, which is identified by the VM number included in the second normalized number.

As the voice storage module VM3 is in the busy condition, the connection of the MTS and the VM3 cannot be performed. The voice storage module VM3 sends to the mobile transit switch (MTS) 23 a notification that the VM3 is currently in the busy condition.

After the notification from the VM3 is received, the MTS 23 issues a reproducing request to another (for example, the VM1) of the voice storage modules 25, which is identified by the VM number included in the final normalized number.

Similarly to the above procedures of the VM2, the voice storage module VM1 reproduces a corresponding voice message and transports the voice message to the mobile station MS 20 via the MTS 23.

After the reproduction of the voice messages with respect to all the normalized numbers from the HLR 35 is carried out, the mobile transit switch (MTS) 23 issues a second reproducing request to the busy-condition voice storage module VM3.

If the VM3 upon the issue of the second reproducing requests is not in the busy condition, the VM3 reproduces a corresponding voice message and transports the voice message to the mobile station (MS) 20. After the reproduction of the voice message is carried out, the connection of the MS 20 and the MTS 23 is disconnected, and the sequence of the voice message reproducing procedures shown in FIG. 23 ends.

Figure 24:
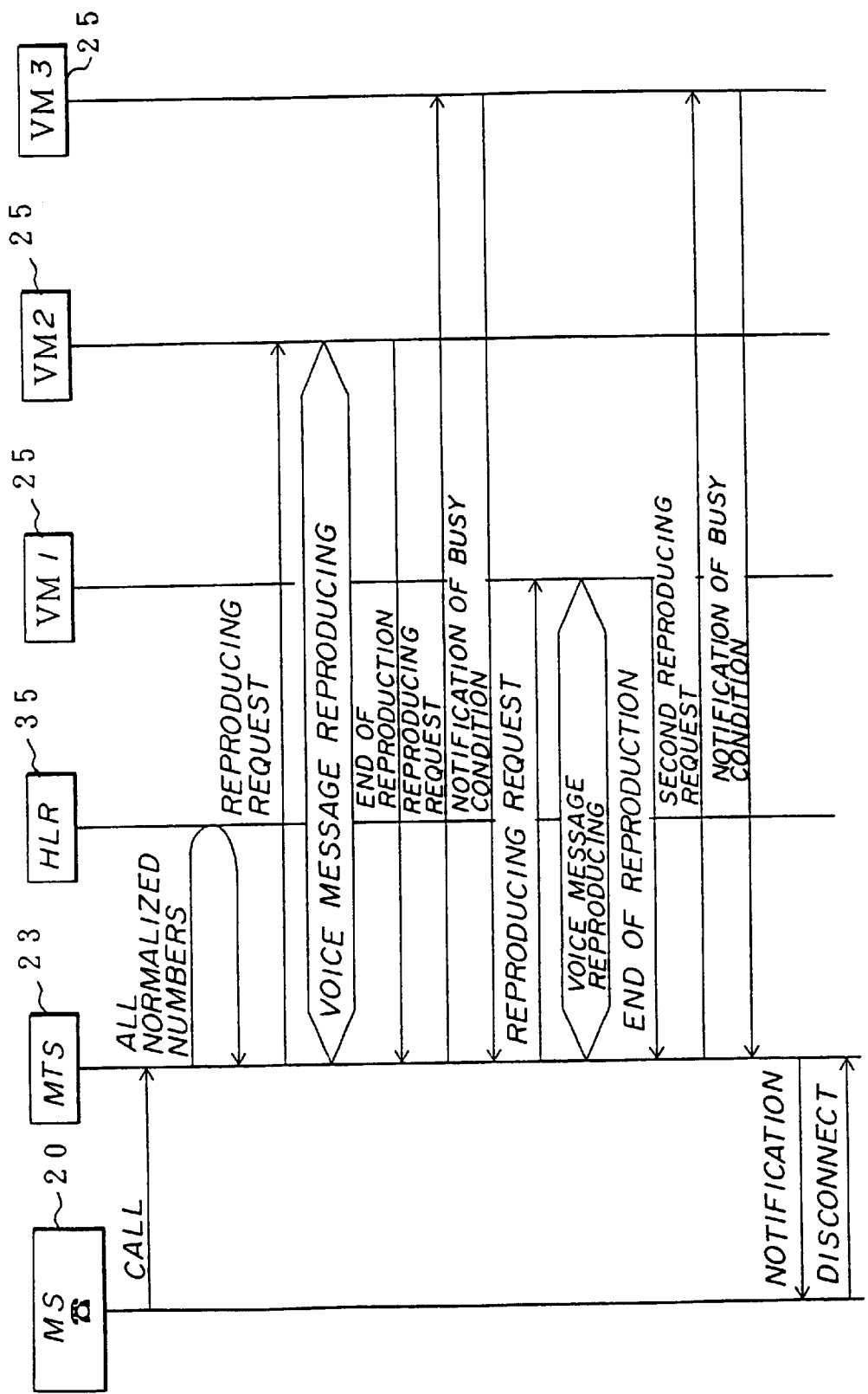

FIG. 24 shows a sequence of voice message reproducing procedures performed in the embodiment of FIG. 14 when a second reproducing request to the busy-condition voice storage module (VM3) is issued but the voice storage module (VM3) is still in the busy condition.

The sequence of voice message reproducing procedures prior to the issue of the second reproducing request in FIG. 24 is the same as the sequence in FIG. 23. In the sequence shown in FIG. 24, the VM3, upon the issue of the second reproducing request, is still in the busy condition. A notification that the VM3 is currently in the busy condition is sent from the VM3 to the MTS 23 again.

In response to the notification from the VM3, the MTS 23 sends to the MS 20 a notification that there was a voice message which was not able to be reproduced by the VM3. After the notification from the MTS 23 is sent to the MS 20, the communication line between the MS 20 and the MTS 23 is disconnected, and the sequence of the voice message reproducing procedures shown in FIG. 24 ends.

Figure 25:
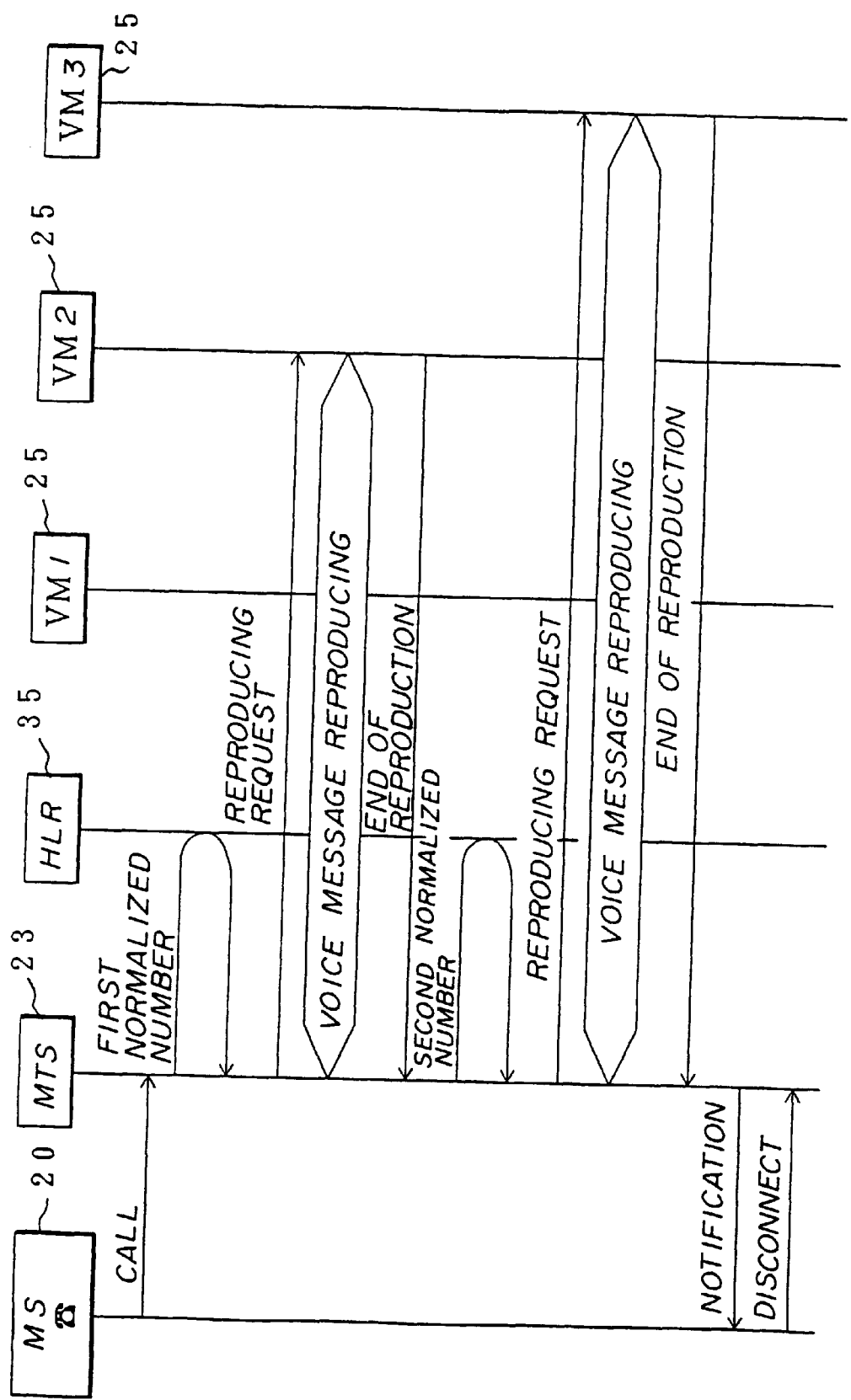
FIGS. 25 through 27 are diagrams for explaining other sequences of voice message reproducing procedures performed in the embodiment of FIG. 18.

FIG. 25 shows a sequence of voice message reproducing procedures performed in the embodiment of FIG. 18 when a notification that the voice storage module (VM1) is in a system-down state or in a congestion state is already sent to the home location register (HLR).

In the sequence shown in FIG. 25, it is assumed that a reproducing request call from a mobile station (MS) 20 (or any fixed station) was made to the voice storage system. Similarly to the embodiment of FIG. 18, the MTS 23 in FIG. 25 receives one by one the normalized numbers related to the subscriber identification number included in the reproducing request call in order of the voice message recording time, from the home location register (HLR) 35.

In response to the reproducing request call from the MS 20, the MTS 23 receives a first normalized number related to the subscriber identification number. The MTS 23 issues a reproducing request to one (for example, the VM2) of the voice storage modules 25, which is identified by the VM number included in the first normalized number. The MTS 23 selects the above one of the voice storage modules 25 which is different from the VM1 currently in the system-down state or in the congestion state.

In response to the reproducing request from the MTS, the VM2 reproduces a voice message identified by the management number which corresponds to the subscriber identification number of the reproducing request and to the voice message recording time of the first normalized number, and transports the voice message to the MS 20 via the MTS 23.

After the reproduction of the voice message with respect to the first normalized number is performed by the VM2, the MTS 23 receives a second normalized number from the HLR 35 and issues a reproducing request to another (for example, the VM3) of the voice storage modules 25, which is identified by the VM number included in the second normalized number. The MTS 23 selects the above another of the voice storage modules 25 which is different from the VM1 currently in the system-down state or in the congestion state.

Similarly to the above procedures of the VM2, the voice storage module VM3 reproduces a corresponding voice message and transports the voice message to the MS 20 via the MTS 23.

After the reproduction of the voice message with respect to the final normalized number is carried out, the MTS 23 sends to the MS 20 a notification that there was a voice message which was not able to be reproduced by the VM1. After the notification from the MTS 23 is sent to the MS 20, the communication line between the MS 20 and the MTS 23 is disconnected. The sequence of the voice message reproducing procedures shown in FIG. 25 ends.

Figure 26:
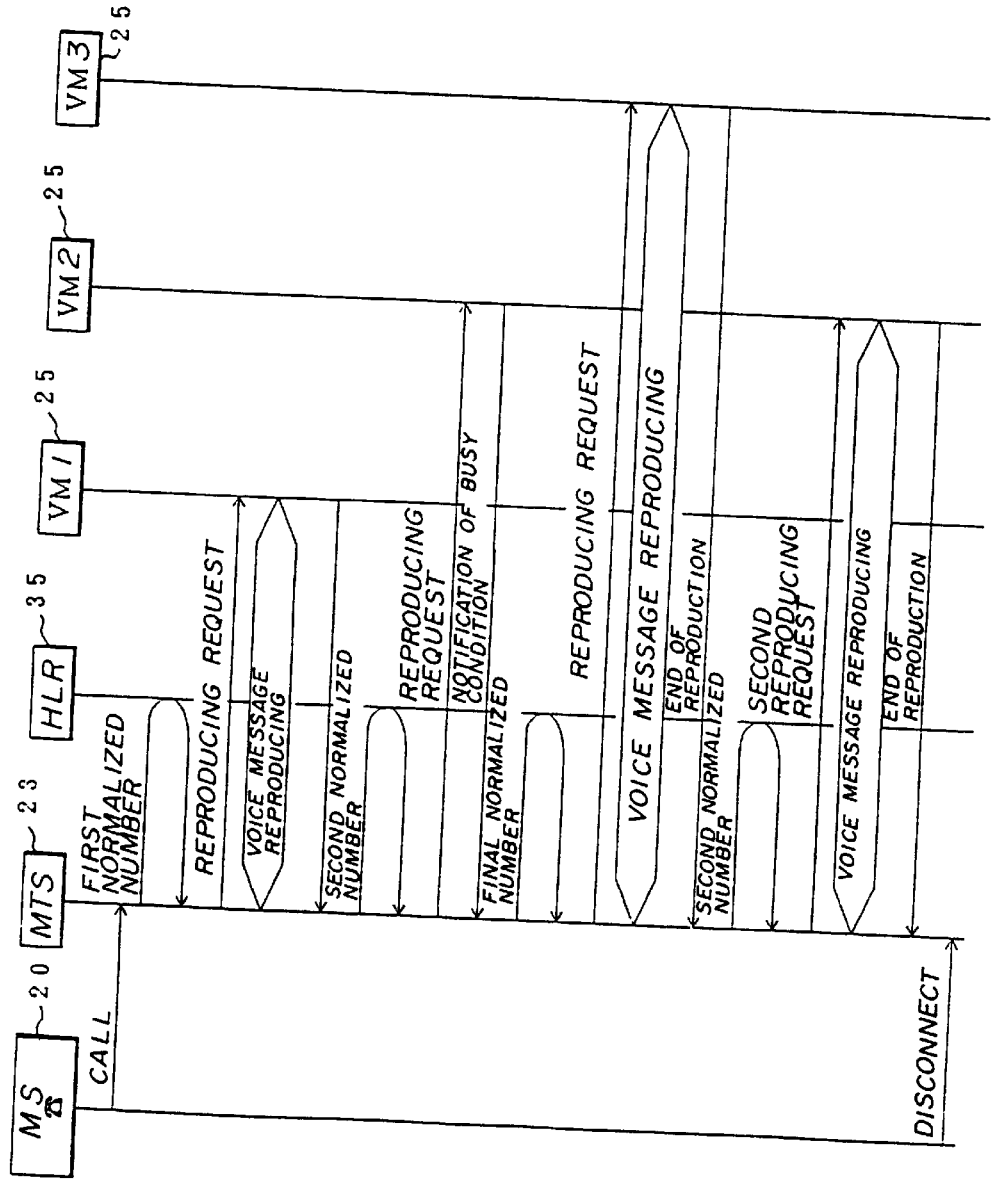

FIG. 26 shows a sequence of voice message reproducing procedures performed in the embodiment of FIG. 18 when the voice storage module (VM2) is in a busy condition.

In the sequence shown in FIG. 26, it is assumed that a reproducing request call from a mobile station (MS) 20 (or any fixed station) was made to the voice storage system. Similarly to the embodiment of FIG. 18, the MTS 23 in FIG. 26 receives one by one the normalized numbers related to the subscriber identification number (included in the reproducing request call) in order of the voice message recording time, from the home location register (HLR) 35.

In response to the reproducing request call from the MS 20, the MTS 23 receives a first normalized number related to the subscriber identification number. The MTS 23 issues a reproducing request to one (for example, the VM1) of the voice storage modules 25, which is identified by the VM number included in the first normalized number.

In response to the reproducing request from the MTS, the VM1 reproduces a voice message identified by the management number which corresponds to the subscriber identification number of the reproducing request and to the voice message recording time of the first normalized number, and transports the voice message to the MS 20 via the MTS 23.

After the reproduction of the voice message with respect to the first normalized number is performed by the VM1, the MTS 23 receives a second normalized number from the HLR 35 and issues a reproducing request to another (for example, the VM2) of the voice storage modules 25, which is identified by the VM number included in the second normalized number.

Since the VM2 is currently in the busy condition, the connection of the MTS 23 and the VM2 cannot be performed. The VM2 sends to the MTS 23 a notification that the VM2 is currently in the busy condition. In addition, the MTS 23 allows the HLR 35 to store the second normalized number of the busy-condition voice storage module VM2 therein.

After the notification from the VM2 is received, the MTS 23 receives a final normalized number from the HLR 35 and issues a reproducing request to another (for example, the VM3) of the voice storage modules 25, which is identified by the VM number included in the final normalized number.

Similarly to the above procedures of the VM1, the voice storage module VM3 reproduces a corresponding voice message and transports the voice message to the MS 20 via the MTS 23.

After the reproduction of the voice message with respect to the final normalized number is carried out, the MTS 23 receives the second normalized number from the HLR 35 again and issues a second reproducing request to the VM2 which is identified by the VM number included in the second normalized number.

If the VM2 is not in the busy condition upon the issue of the second reproducing request, the VM2 reproduces a corresponding voice message and transports the voice message to the MS 20 via the MTS 23.

After the reproduction of the voice message with respect to the second normalized number is carried out, the communication line between the MS 20 and the MTS 23 is disconnected. The sequence of the voice message reproducing procedures shown in FIG. 26 ends.

Figure 27:
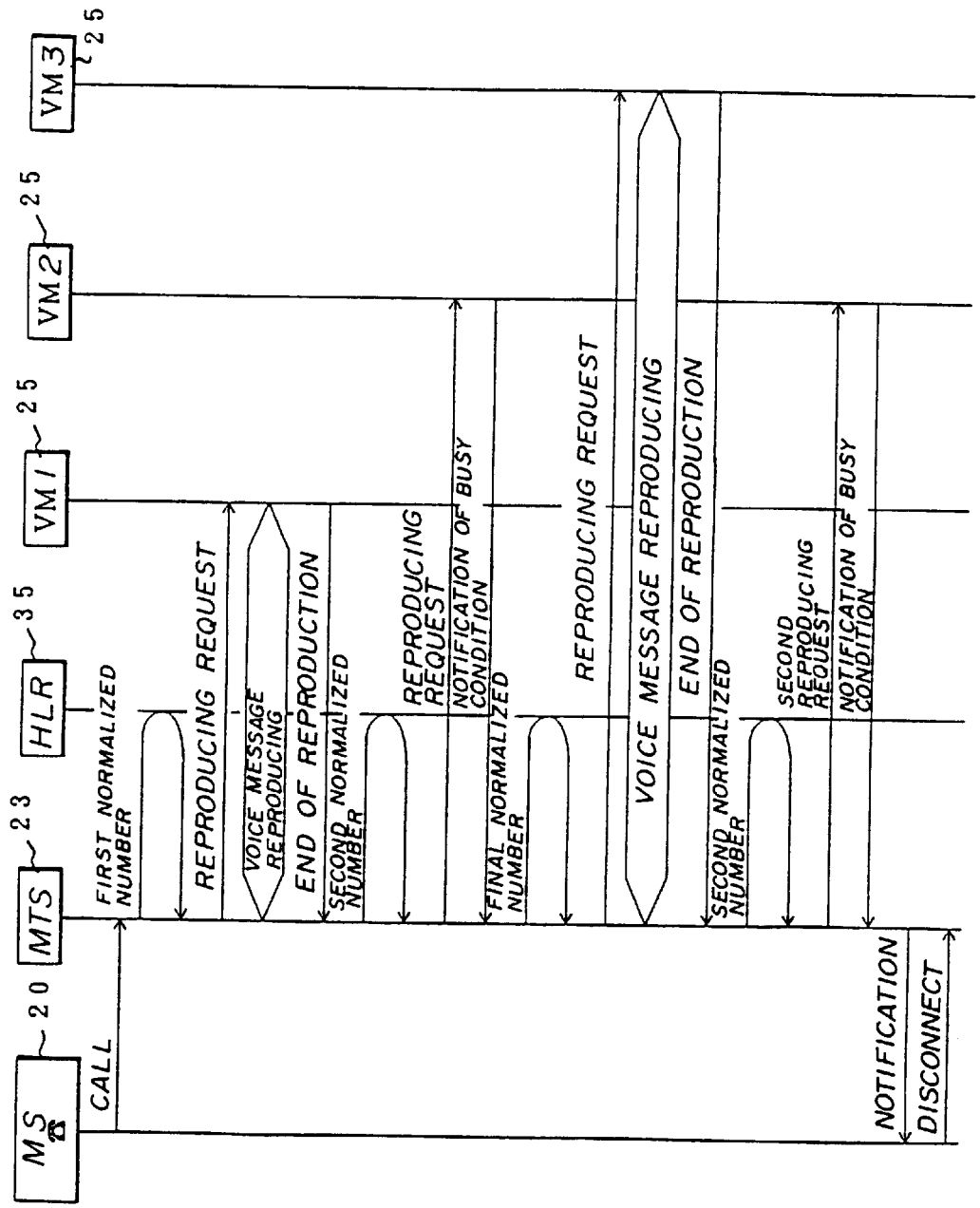

FIG. 27 shows a sequence of voice message reproducing procedures performed in the embodiment of FIG. 18 when a second reproducing request to the busy-condition voice storage module (VM2) is issued but the voice storage module (VM2) is still in the busy condition.

The sequence of voice message reproducing procedures prior to the issue of the second reproducing request in FIG. 27 is the same as the sequence in FIG. 26. In the sequence shown in FIG. 27, the VM2 is still in the busy condition upon the issue of the second reproducing request. A notification that the VM2 is currently in the busy condition is sent from the VM2 to the MTS 23 again.

In response to the notification from the VM2, the MTS 23 sends to the MS 20 a notification that there was a voice message which was not able to be reproduced by the VM2. After the notification from the MTS 23 is sent to the MS 20, the communication line between the MS 20 and the MTS 23 is disconnected, and the sequence of the voice message reproducing procedures shown in FIG. 27 ends.

Further, the present invention is not limited to the above-described embodiments, and variations and modifications may be made without departing from the scope of the present invention.

What is claimed is:

1. A voice storage system comprising:
 a plurality of voice storage modules in which a voice message for a subscriber is recorded and stored;
 a mobile transit switch which selects one of the plurality of voice storage modules when a recording request call is received, so that the voice message is recorded in the selected voice storage module;
 a home location memory which stores a normalized number including a voice storage module number of the selected voice storage module and a management number including a subscriber identification number of the subscriber which are correlated with respect to the recorded voice message; and
 a voice message reproducing unit, provided in said mobile transit switch, which issues a reproducing request to one of the voice storage modules when a reproducing request call is received said voice message reproducing unit receiving the normalized number from the home location memory, said normalized number related to the subscriber identification number included in the reproducing request call, said one of the voice storage modules being identified by the voice storage module number included in said normalized number, so that said one of the voice storage modules reproduces the voice message in response to said reproducing request,
 wherein said mobile transit switch receives an activity ratio of each of the voice storage modules from the home location register in response to the recording request call, and said mobile transit switch selects one of the voice storage modules in accordance with the smallest activity ratio among the received activity ratios of the voice storage modules.

2. The voice storage system according to claim 1, wherein said home location memory stores the normalized number which includes a voice message recording time of the recorded voice message in addition to the voice storage module number of the selected voice storage module.

3. The voice storage system according to claim 1, wherein, when one of the voice storage modules is in a system-down state or in a congestion state, said mobile transit switch selects another of the voice storage modules in response to the recording request call.

4. The voice storage system according to claim 1, wherein, when one of the voice storage modules is in a busy condition, said mobile transit switch selects another of the voice storage modules in response to the recording request call.

5. The voice storage system according to claim 1, wherein said mobile transit switch receives an activity ratio of each of the voice storage modules from the home location register in response to the recording request call, and said mobile transit switch selects one of the voice storage modules in accordance with the smallest activity ratio among the received activity ratios of the voice storage modules.

6. The voice storage system according to claim 1, wherein said voice message reproducing unit receives, from the home location register, all normalized numbers related to the subscriber identification number included in the reproducing request call at a time.

7. The voice storage system according to claim 1, wherein said voice message reproducing unit receives one by one, from the home location register, the normalized numbers related to the subscriber identification number included in the reproducing request call.

8. The voice storage system according to claim 1, wherein, when one of the voice storage modules is in a system-down state or in a congestion state, said voice message reproducing unit issues the reproducing request to another of the voice storage modules.

9. The voice storage system according to claim 1, wherein, when one of the voice storage modules is in a busy condition, said voice message reproducing unit issues the reproducing request to another of the voice storage modules.

10. The voice storage system according to claim 9, wherein said voice message reproducing unit issues a second reproducing request to said one of the voice storage modules after the reproduction of the voice message is performed by said another of the voice storage modules.

11. The voice storage system according to claim 8, wherein, after the reproduction of the voice message is performed by said another of the voice storage modules, said voice message reproducing unit sends back to the subscriber a notification that the reproduction of the voice message by said one of the voice storage modules is avoided.

12. The voice storage system according to claim 9, wherein, after the reproduction of the voice message is performed by said another of the voice storage modules said voice message reproducing unit sends back to the subscriber a notification that the reproduction of the voice message by said one of the voice storage modules is avoided.

* * * * *